(12) United States Patent
King

(10) Patent No.: US 9,817,423 B2
(45) Date of Patent: Nov. 14, 2017

(54) RENEWABLE ENERGY SYSTEM WITH INTEGRATED HOME POWER SUPPLY SYSTEM

(71) Applicant: King Electric Vehicles Inc., Schenectady, NY (US)

(72) Inventor: Robert Dean King, Schenectady, NY (US)

(73) Assignee: King Electric Vehicles Inc., Schenectady, NY (US)

( * ) Notice: Subject to any disclaimer, the term of this patent is extended or adjusted under 35 U.S.C. 154(b) by 47 days.

(21) Appl. No.: 14/987,998

(22) Filed: Jan. 5, 2016

(65) Prior Publication Data

US 2017/0168516 A1    Jun. 15, 2017

Related U.S. Application Data

(63) Continuation of application No. 14/963,458, filed on Dec. 9, 2015, now Pat. No. 9,559,521.

(51) Int. Cl.
*G05F 1/66* (2006.01)
*H02J 7/34* (2006.01)
*G05B 19/048* (2006.01)

(52) U.S. Cl.
CPC ............ *G05F 1/66* (2013.01); *G05B 19/048* (2013.01); *H02J 7/34* (2013.01); *G05B 2219/40458* (2013.01)

(58) Field of Classification Search
CPC ....... G05F 1/66; H02J 7/34; H02J 7/35; H02J 3/32; H02J 9/00; H02J 3/00;
(Continued)

(56) References Cited

U.S. PATENT DOCUMENTS 7,274,975 B2  9/2007  Miller
8,779,724 B2  7/2014  Ichikawa
(Continued)

OTHER PUBLICATIONS

Tesla Powerall, "Storage for a Sustainable Home," Jan. 2015, pp. 1-6, http://www.teslamotors.com/powerwall.
(Continued)

*Primary Examiner* — Jared Fureman
*Assistant Examiner* — Rafael Pacheco
(74) *Attorney, Agent, or Firm* — Ziolkowski Patent Solutions Group, SC

(57) ABSTRACT

A method for regulating a power transfer between a utility grid and a renewable energy system includes receiving a power transfer request from the utility grid at a controller of the renewable energy system that includes at least one of a desired power transfer level, power factor and energy or time duration of the power transfer. A SOC of an energy storage device of the renewable energy system and a power output of the renewable energy source are compared to respective SOC and power output thresholds, with the power transfer request being completed if the SOC and the power output are greater than the respective SOC and power output thresholds so as to cause the requested power to be transferred to the utility grid, and the power transfer request being denied if the SOC and the power output are less than the respective SOC and power output thresholds.

21 Claims, 10 Drawing Sheets

(58) Field of Classification Search
CPC ............... H02J 13/0079; G05B 19/048; G05B 2219/40458; G06Q 10/04; G06Q 10/0637; G06Q 50/06
See application file for complete search history.

(56) References Cited

U.S. PATENT DOCUMENTS

| | | |
|---|---|---|
| 8,872,379 B2 | 10/2014 | Ruiz et al. |
| 2010/0306027 A1 | 12/2010 | Haugh |
| 2012/0074893 A1 | 3/2012 | Cole |
| 2013/0042121 A1 | 2/2013 | Yechieli |
| 2013/0241485 A1* | 9/2013 | Snyder ................ B60L 11/1809 320/109 |
| 2014/0062192 A1 | 3/2014 | Vichnyakov |

OTHER PUBLICATIONS

"Adding the battery back-up power option to existing grid-tied PV/solar systems," OutBack Power Technologies, Arlington, WA, 2014, pp. 1-14.
Larsen, "Third Trip Around the Fusion Plant in My Nissan Leaf," Current EVents, Apr. 2015, pp. 10-13.

\* cited by examiner

RENEWABLE ENERGY SYSTEM WITH INTEGRATED HOME POWER SUPPLY SYSTEM

CROSS REFERENCE TO RELATED APPLICATION

The present application is a continuation of and claims priority to U.S. Non-Provisional application Ser. No. 14/963,458, filed Dec. 9, 2015, the disclosure of which is incorporated herein in its entirety.

BACKGROUND OF THE INVENTION

The invention relates generally to grid-tied renewable energy systems, and more specifically to a home power supply system and associated interface for use with a grid-tied renewable energy system that intelligently controls power flow from a renewable energy source to a load through two parallel paths.

Renewable energy sources, including photovoltaic (PV) and wind turbine systems for example, are utilized with increasingly regularity by home owners as a means to generate electrical power for personal use. A majority of residential renewable energy systems are in the form of grid-tied systems that act as a supplemental power source that is used in combination with power from the utility grid, with some estimates indicating that over 300,000 such grid-tied residential photovoltaic systems are in use in the United States. Such renewable energy sources can reduce the utility grid demand or load during periods of the day when renewable energy is available by replacing a portion of the utility energy with the renewable solar and wind power. Conventional grid-tied renewable energy systems typically use a net-metering device to determine the utility energy use by measurement and integration of the instantaneous load power, minus the renewable power that is being generated. When the integrated load power exceeds the integrated renewable power, the meter indicates a positive amount of energy supplied from the grid to the customer, although a lower amount of grid energy is supplied than if no renewable power was utilized. However when the integrated renewable power is greater than the integrated load power, the meter indicates a negative amount of energy and the customer is able to return or sell energy back to the utility.

With regard to existing systems and methods for net-metering grid-tied renewable energy systems, there are several recognized drawbacks that limit the usefulness and cost effectiveness of the renewable energy system. The first drawback to today's net-metering systems is that, often times, energy is sold back to the utility by the home or business owner at a wholesale rate ($/kWh) that is less than a retail rate ($/kWh) at which the home or business owner buys energy from the utility to supply the required loads, with the owner sometimes also being subject to additional demand charges for energy bought from the utility. That is, energy is often sold back to the utility at a low wholesale rate during portions of the day when renewable energy production exceeds load energy requirements, and energy is bought from the utility at a high retail rate later in the day when renewable energy production is less (e.g., such as with photovoltaic power not being generated during evening hours) than load energy requirements, with additional demand charges also often being applied during periods of the evening when demand is high. Accordingly, The second drawback to today's net-metering systems and methods is that, during utility power outages, the conventional net-meter interface equipment disables the renewable energy transfer both back to the utility (to protect utility personnel who might be working on utility lines to fix the grid) and also disables the supply of energy to the load, even when renewable energy is available. This disabling of the supply of energy to the load from the renewable energy system can be particularly problematic for individuals who require a source of power (from a combination of the utility grid and the renewable energy system) to deal with their medical equipment/conditions or other critical loads, including lighting and communication equipment.

To address both the cost and availability issues associated with net-metering of grid-tied renewable energy systems, a common solution is to add a large and costly stationary energy storage device, often referred to as a "home" battery. The home battery is typically sized to provide adequate storage for the renewable energy that is intermittently generated by the renewable source, such that the renewable energy is available for use/reuse during the entire period of the day or days when no renewable energy is available. By providing such storage of the renewable energy, the home battery offers potential savings to a customer by reducing the amount of energy that needs to be purchased from the utility at high retail rate, such as during periods (e.g., evening hours) when energy production is less and energy demand is high. It is recognized, however, that the cost savings achieved via the home battery based on the mismatch of the utility $/kWh rates between selling and buying the electrical grid energy at wholesale and retail rates must be traded off versus the additional cost of the large home battery and associated power electronics and controls.

The home battery also addresses the issue of the conventional net-meter interface equipment disabling the supply of energy from the renewable source to the load when the utility grid fails, as renewable energy stored in the home battery can be used to power loads during a grid failure. However, during extended grid outages, the home battery is often not large enough to provide energy to loads for a long period of time while still maintaining an adequate state-of-charge, such that a gasoline, diesel, natural gas, propane, or hydrogen fuel-fired stand-alone emergency generator and associated battery charger or a fuel cell generator that is fueled by hydrogen, methanol, or methane may be required to maintain the state-of-charge of the home battery, adding further cost to the customer.

An additional drawback to existing arrangements of a renewable energy source, net-metering device and home battery is that the overall system efficiency of the system from the renewable energy source to the customer load is not optimal. That is, efficiency of the overall renewable energy system is reduced due to the round-trip efficiency losses—which include conversion and battery efficiency losses associated with initially transferring the renewable energy into the home battery and conversion and battery efficiency losses associated with later transferring the energy from the battery to the customer load(s).

It would therefore be desirable to have a system and method for intelligently controlling power flow from a renewable energy source to a load and energy storage device in a grid-tied renewable energy system that overcomes existing cost and availability issues associated with net-metering of grid-tied renewable energy systems. It would also be desirable for such a system and method to provide an improved efficiency in transferring power from the renewable energy source to the customer load that minimizes losses. It would be still further desirable for such a system and method to be retrofittable with existing grid-tied renewable energy systems.

BRIEF DESCRIPTION OF THE INVENTION

According to an aspect of the invention, a renewable energy system coupleable to each of a utility grid and a load includes a renewable energy source configured to generate a power output and a power supply system connected to the renewable energy source to selectively receive at least a portion of the power output, the power supply system comprising a voltage modification circuit configured to condition power received thereby to generate a DC power output, at least one energy storage device configured to store the DC power output from the voltage modification circuit, and a power supply inverter connected to the at least one energy storage device to receive DC power therefrom and convert the DC power to an AC power output. The renewable energy system also includes a controller in operable communication with the renewable energy source, the power supply system and the utility grid to control a transfer of power therebetween, the controller being programmed to receive a power transfer request from the utility grid, the power transfer request including at least one of a desired power transfer level, power factor and energy or time duration of the power transfer, compare a state-of-charge (SOC) of the at least one energy storage device and the power output of the renewable energy source to respective pre-determined SOC and power output thresholds, complete the power transfer request from the utility grid if one or both of the SOC of the at least one energy storage device and the power output of the renewable energy source are greater than the respective SOC and power output thresholds, and deactivate the power transfer request from the utility grid if one or both of the SOC of the at least one energy storage device and the power output of the renewable energy source are less than the respective SOC and power output thresholds.

According to another aspect of the invention, a method is provided for regulating a power transfer between a utility grid and a renewable energy system that includes a renewable energy source and a power supply system configured to selectively store and condition power provided thereto via an arrangement of a voltage modification circuit, energy storage system and power supply DC-AC inverter in the power supply system. The method includes receiving a power transfer request from the utility grid at a controller of the renewable energy system, the power transfer request including at least one of a desired power transfer level, power factor and energy or time duration of the power transfer to the utility grid. The method also includes comparing, via the controller, a state-of-charge (SOC) of one or more energy storage devices of the energy storage system and a power output of the renewable energy source to respective pre-determined SOC and power output thresholds, completing the power transfer request from the utility grid if one or both of the SOC of the one or more energy storage devices and the power output of the renewable energy source are greater than the respective SOC and power output thresholds so as to cause the requested power to be transferred to the utility grid, and denying the power transfer request from the utility grid if one or both of the SOC of the one or more energy storage devices and the power output of the renewable energy source are less than the respective SOC and power output thresholds.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENTS

Embodiments of the invention relate to a home power supply system and associated interface for use with a grid-tied renewable energy system. The home power supply system intelligently controls power flow from a renewable energy source to a load through two parallel paths.

Figure 1:
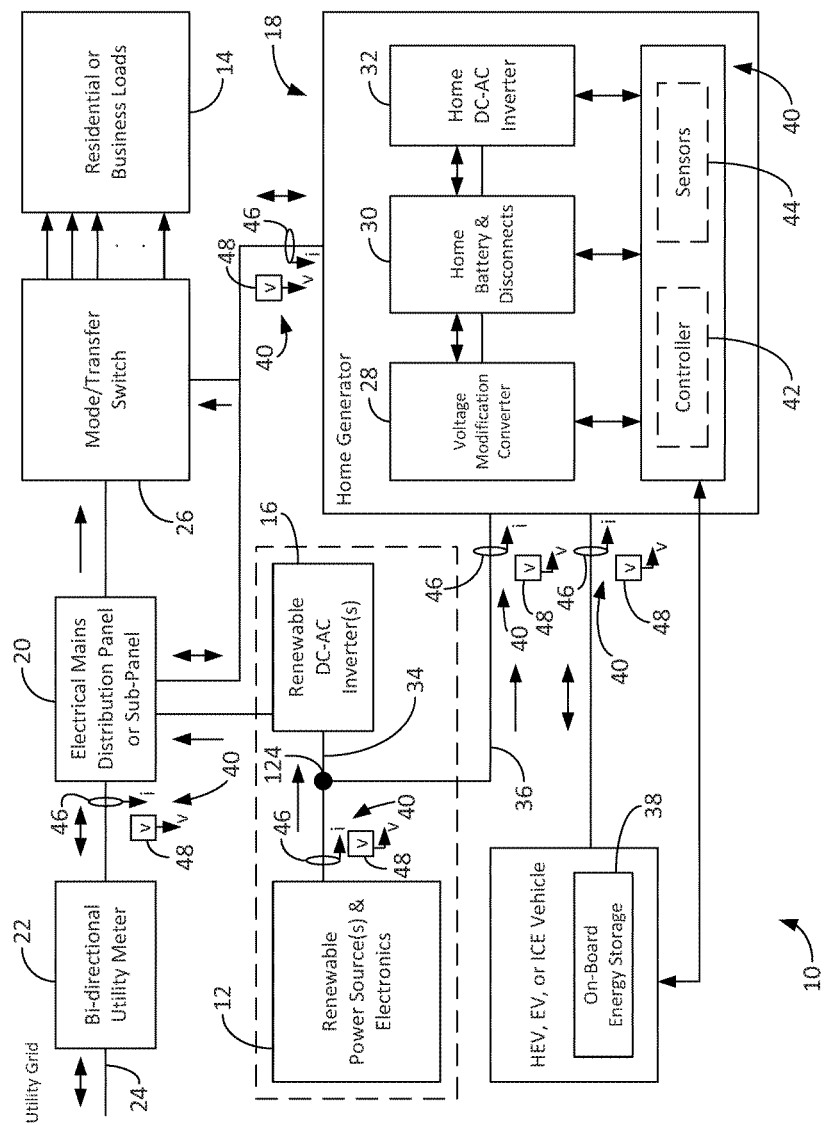
FIG. 1 is a schematic diagram of a renewable energy system according to an embodiment of the invention.

Referring to FIG. 1, a block schematic view of a grid-tied renewable energy system 10 is shown that provides for an intelligent control of power from a renewable energy source 12 to a load 14 utilizing a conventional net-metering unit and grid-tied DC-AC inverter 16 (tied to the electric utility grid), along with an add-on home power supply system 18 (also referred to as a home generator or uninterruptable power supply (UPS) system). The renewable energy system 10, as the term is used in this specification, thus is a collection of computer hardware, computer software, machinery, and other components that controls and distributes power from one or more renewable energy sources to one or more loads. As defined herein, the "renewable" power source is configured as a source that utilizes renewable resources, such as wind, solar power or water, for example, to generate power. According to an exemplary embodiment, and as described in the systems set forth below, the renewable energy source 12 utilized in the renewable energy system 10 comprises a photovoltaic ("PV") system, although it is to be recognized that a micro-hydroelectric system or wind turbine system could instead be incorporated as part of the renewable energy system 10.

The example grid-tied renewable energy system 10 in FIG. 1 is depicted as a "local" system, so described because the system is maintained and operated by and for the benefit of the owner of the renewable energy system 10 in contrast to systems located and operated by other entities. "Local" here may also mean that the renewable energy system 10 is physically located near the load 14 to which the renewable energy system 10 provides power, but such a limitation on location is not necessary. That is, a local renewable energy system 10 for which net-metering and power distribution is carried out in accordance with embodiments of the present invention may be physically located near the load 14 to which the renewable energy system 10 provides power or not.

As shown in FIG. 1, the renewable energy source 12 of the renewable energy system 10 is tied to the utility grid via an arrangement of a renewable power DC-AC inverter 16, an electrical mains distribution panel or sub-panel 20, and a bi-directional utility meter (or "net-meter") 22—which may be incorporated as part of the distribution panel or as a separate device. The renewable power DC-AC inverter 16 is a grid-tied inverter—i.e., an inverter that monitors AC supply waveforms from the utility grid 24 along a power line, also referred to as "mains," and inverts DC power from the local renewable energy source 12 to AC power in-phase with the AC grid power for supply to the load and the utility grid. The distribution panel 20 may include a plurality of switches and protection components therein (not shown), including an electrical mains switch that (when open) disconnects the load from power provided by the utility grid, line conditioners, circuit breakers, and the like. Power may be routed through the distribution panel 20 to provide a flow of power to the load 14, with the load comprising a local electrical load (of one or more devices/loads) that is a consumer of AC power. In the embodiment of FIG. 1, a mode switch 26 is actuatable to control the flow of power to the load 14, as will be described in further detail below. While the mode switch 26 is illustrated as a single switch, it is to be understood that the mode switch 26 may in fact be provided as numerous, separate switches each including one or more switching elements 132 therein, as will be illustrated in specific embodiments of the invention as shown in FIGS. 2-5. Accordingly, the term "mode switch" is not meant to be limited or interpreted as referring to only a single switch.

As would be understood by one skilled in the art, the net-meter 22 is device that meters net-electricity distributed through the electrical mains distribution panel 20 to the load. The term "net" here refers to the difference in power provided to the load 14 from the utility and locally generated power provided to the load and provided to the utility along power line. Locally generated power as the term is used in this specification refers, as context requires, to any power generated by a local renewable energy source 12 in the renewable energy system 10, whether that power is currently generated and not stored or the power was previously generated and stored in home power supply system 18. With net-metering, a renewable energy system owner may receive, from a utility, one or more credits for at least a portion of electricity generated by the renewable energy system 10 and provided to the utility. That is, a utility pays a renewable energy system owner for electricity received by the utility and generated by the owner's system.

As indicated above, an add-on home power supply system 18 is included in the renewable energy system 10, with the home power supply system 18 providing for a selective storage of power generated by the renewable energy source 12 and providing for a selective output of power to the load 14. The home power supply system 18 is configured to have a power rating of that is larger than the maximum power of the renewable energy source 12, so as to allow for a larger number of loads and higher power transient loads to be operated from the renewable energy system 10 than if the home power supply system 18 were not present.

In an exemplary embodiment, the home power supply system 18 is provided as a retrofit kit that may be added to an existing grid-tied renewable energy system 10 that performs net-metering. The home power supply system 18 may generally be characterized as including a voltage modification circuit 28, an energy storage system 30, and a power supply DC-AC inverter 32. The voltage modification circuit 28 provides an interface between the renewable energy source 12 and the home power supply system 18 and is configured to condition power (DC-DC conversion or AC-DC conversion) received thereby to generate a DC power output that is provided to the energy storage system 30. The energy storage system may be configured as one or more stationary or "home" energy storage devices (e.g., lithium ion batteries or other suitable battery technology, including lead-acid, nickel-metal hydride, sodium nickel chloride, sodium metal halide, or sodium sulfur batteries of appropriate size) with associated DC disconnects, with the stationary energy storage devices storing the DC power provided thereto from the voltage modification circuit 28 and providing DC power to the power supply DC-AC inverter 32 as desired. The power supply DC-AC inverter 32 then converts the DC power to an AC power output that may be provided to the distribution panel 20 and/or the mode switch 26 for supplying to the load 14 or utility grid 24, as desired. In an exemplary embodiment, the power supply DC-AC inverter 32 is sized appropriately for the home power supply system 18 (i.e., for the power rating of the home power supply system 18) so as to minimize (switching) losses associated during inversion of DC power from the stationary energy storage devices 30, thereby increasing the efficiency of the home power supply system 18.

According to the embodiment of FIG. 1, a construction of the renewable energy system 10 is such that parallel first and second connection paths 34, 36 are provided between the renewable energy source 12 and the load 14. The first connection path 34 is routed such that the renewable power DC-AC inverter 16 is positioned thereon between the renewable energy source 12 and the distribution panel 20, with the first connection path 34 providing for a transfer of AC power from the renewable power DC-AC inverter 16 to the distribution panel 20. The second connection path 36 is routed such that the home power supply system 18 is positioned thereon between the renewable energy source 12 and the distribution panel 20, with the second connection path 36 providing for a transfer of AC power from the home power supply system 18 to the distribution panel 20. The arrangement of the parallel first and second connection paths 34, 36 allows for power generated by the renewable energy source 12 to be selectively routed to the load 14 (or utility grid) along the first connection path 34 and the second connection path 36 in a controllable manner.

In one embodiment, and as illustrated in FIG. 1, a mobile energy storage device 38 may also be incorporated as part of the renewable energy system 10, to provide further storage of power generated by the renewable energy source 12. The mobile energy storage device 38 may be incorporated into one of a hybrid electric vehicle (HEV), a plug-in hybrid electric vehicle (PHEV), and electric vehicle (EV) or and internal combustion engine (ICE) vehicle, for example, and is bi-directionally electrically coupled to the voltage modification circuit 28 of home power supply system 18. Accordingly, the mobile energy storage device 38 may receive power from the voltage modification circuit 28 in order to provide for charging thereof, and may provide power to the voltage modification circuit 28 in order to provide power to the home power supply system 18.

Also included in home power supply system 18 and/or operably coupled to the home power supply system 18, is a control system 40 comprised of a controller 42 and a sensor array 44 that collectively operate to monitor and control operation of the renewable energy system 10. The sensor array provides feedback inputs to the controller 42 on a number of parameters associated with operation of the renewable energy system 10, including a condition of the utility grid 24, a power requirement of the load 14 (via either measurement or based on net-meter reading/feedback), a power output from the renewable energy source 12, a number, temperature, and/or state-of-charge (SOC) of the stationary energy storage device(s) 30, a SOC of the mobile energy storage device 38, historical trends of renewable power generation and load requirements, and other parameters. Accordingly, current, voltage and temperature sensors may be provided as part of the control system 40—with current/voltage sensors 46, 48 being specifically identified in FIG. 1. The controller 42 analyzes the feedback input in order to selectively control a flow of power from the renewable energy source 12, a flow of power to/from the home power supply system 18, and a flow of power to/from the utility grid 24, with such power flows being controlled intelligently so as to reduce utility transient loads and carbon emissions during certain times of the day, lower or eliminate excessive demand charges to the customer, and provide power to the load 14 even during occurrences of a utility grid failure.

Figures 2, 3:
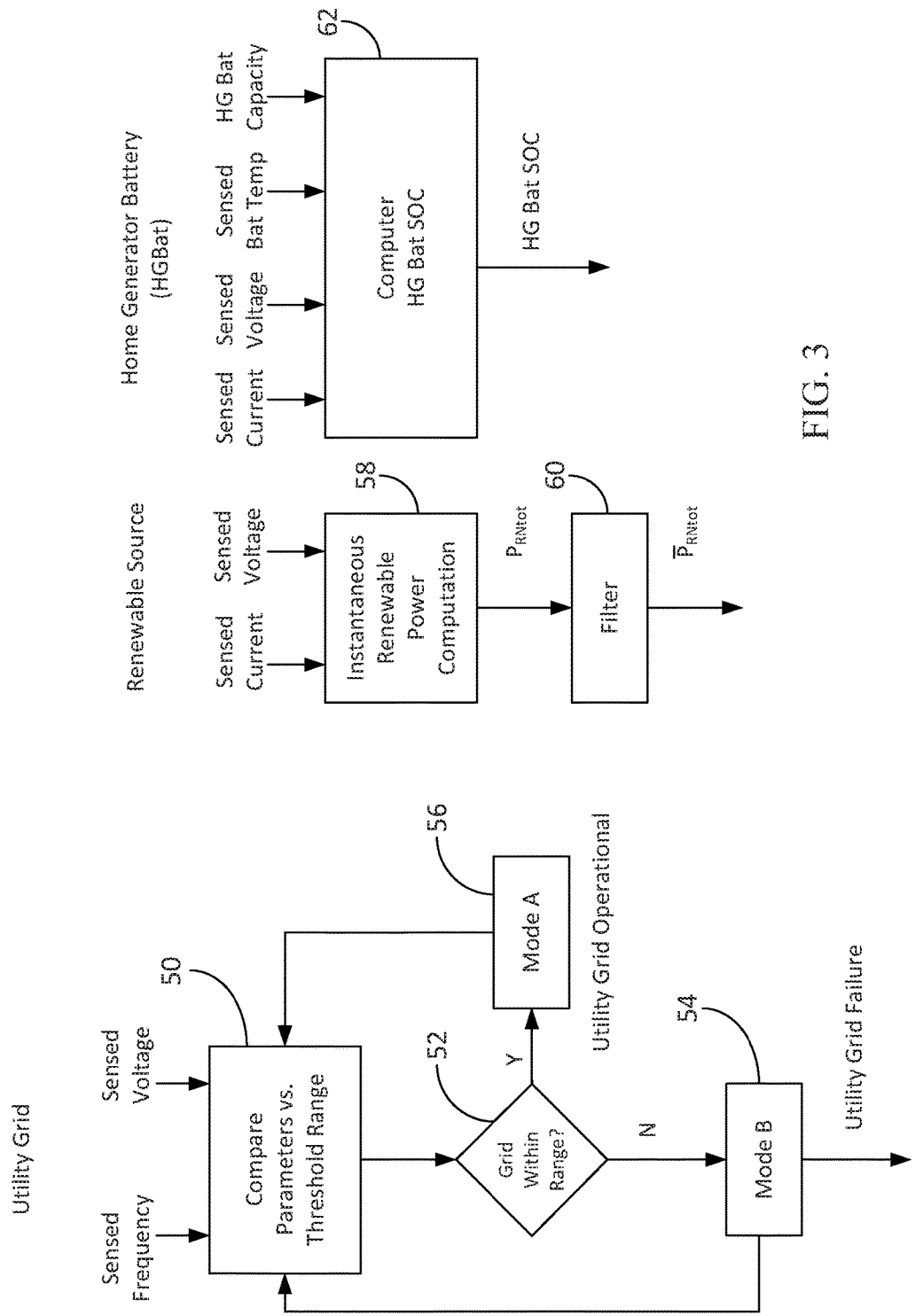
FIG. 2 is a flowchart illustrating a technique for determining an operating condition of the utility grid, as implemented by the renewable energy system of FIG. 1, according to an embodiment of the invention.
FIG. 3 is a flowchart illustrating a technique for sensing and determining a number of operating parameters of the renewable energy system of FIG. 1.

In controlling operation of the renewable energy system 10, the control system 40 first functions to sense and analyze voltage and frequency readings of the utility grid power to determine an operating condition of the utility grid 24, with such an analysis being illustrated in FIG. 2. As shown in FIG. 2, a comparison of the voltage and frequency readings of the utility grid power to pre-determined thresholds (or threshold ranges) is first performed at STEP 50. A determination is then made at STEP 52 as to whether the utility grid 24 is operating as normal or there is instead a utility grid failure (i.e., are the measured voltage/current within the acceptable threshold range). In the event that a utility grid failure is identified, as indicated at STEP 54 and as might be present due to/during a phase voltage mismatch and/or low voltage brown-out, the controller 42 controls operation of the mode switch 26 such that it operates in an "emergency power" mode ("Mode B"). In the emergency mode of operation, the mode switch 26 prevents any power from the renewable energy system 10 and home power supply system 18 from being supplied to the utility grid 24 (in order to protect utility personnel).

In the event that the utility grid is identified as operating normally, as indicated at STEP 56, the controller 42 controls operation of the mode switch 26 such that it operates in a "normal power" mode ("Mode A"). In normal mode, the controller 42 also controls the renewable energy system 10 and home power supply system 18 to operate according to one of a number of different control schemes, dependent upon the sensed operating parameters of the renewable energy system 10, as described in detail here below.

Figure 4:
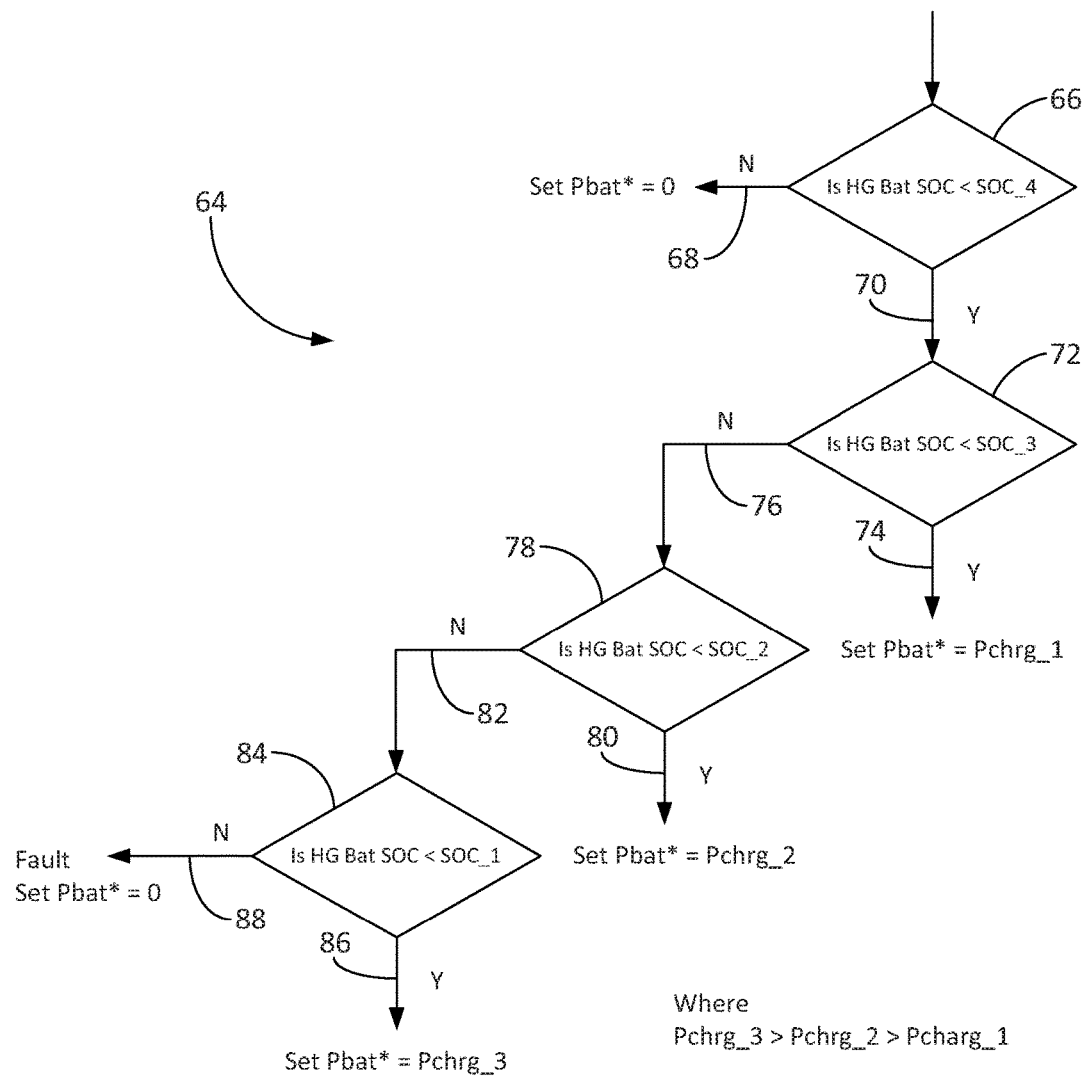
FIG. 4 is a flowchart illustrating a technique for determining a charging strategy for supplying power from the renewable energy source to the home power supply system, as implemented by the renewable energy system of FIG. 1, according to an embodiment of the invention.
Figure 5:
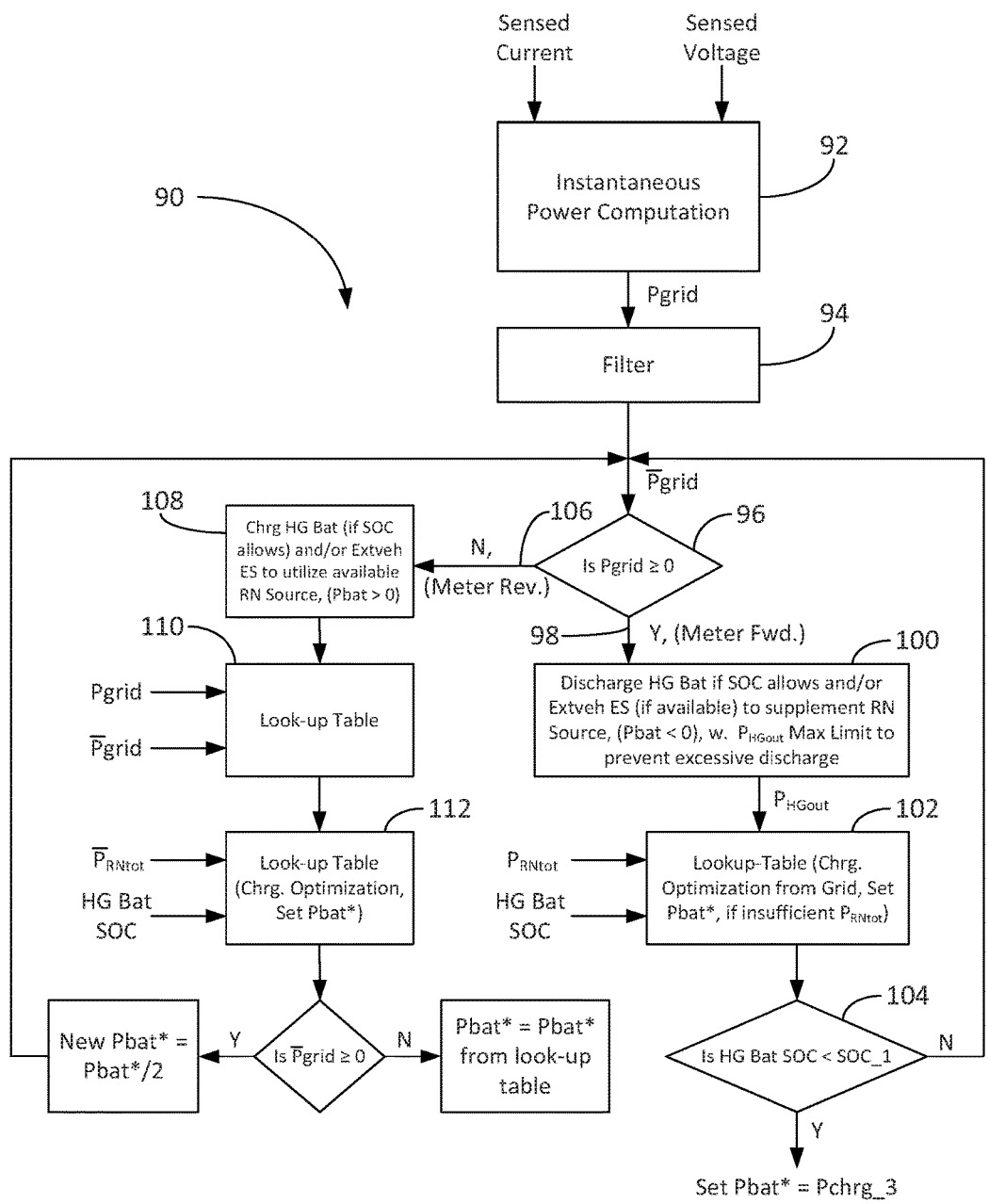
FIG. 5 is a flowchart illustrating a technique for determining an appropriate control scheme for operating the renewable energy system of FIG. 1 when the utility grid is operating in a normal condition, according to an embodiment of the invention.

Referring now to FIGS. 3-5, a number of flowcharts are provided to illustrate techniques for obtaining sensed operating parameters of the renewable energy system 10 and determining an appropriate control scheme for operating the renewable energy system 10. Referring first to FIG. 3, inputs to controller 42 are illustrated with regard to a sensed voltage and current of the renewable energy source 12, as well as a sensed current, voltage, and battery temperature of the stationary energy storage device 30, and a capacity of the stationary energy storage device 30. The inputs of the sensed voltage and current of the renewable energy source 12 enable the controller 42 to determine an instantaneous power of the renewable energy source 12, as indicated at STEP 58, which can be filtered at STEP 60 to output a magnitude of the power. The inputs of the sensed current, voltage, and battery temperature of the stationary energy storage device 30, and the capacity of the stationary energy storage device 30 enable the controller 42 to determine the SOC of the stationary energy storage device 30, as indicated at STEP 62.

Referring now to FIG. 4, a technique 64 is illustrated for determining a charging strategy for supply power from the renewable energy source 12 to the home power supply system 18—i.e., to the stationary energy storage device 30 of the home power supply system 18. As indicated at STEP 66, an input is provided regarding a SOC of the stationary energy storage device 30, such that a determination can be made regarding whether the SOC of the stationary energy storage device 30 is below a first pre-determined threshold—with the first pre-determined threshold comprising a SOC above which no additional charging of the stationary energy storage device 30 is required. If it is determined that the SOC of the stationary energy storage device 30 is above the first pre-determined threshold, as indicated at 68, then no additional charging of the stationary energy storage device 30 is required (i.e., $P_{bat}^*=0$). If it is determined that the SOC of the stationary energy storage device 30 is below the first pre-determined threshold, as indicated at 70, then a subsequent determination is made at STEP 72 regarding whether the SOC of the stationary energy storage device 30 is greater than a second pre-determined threshold (i.e., is the SOC between the first and second thresholds). If it is determined that the SOC of the stationary energy storage device 30 is above the second pre-determined threshold, as indicated at 74, then charging of the stationary energy storage device 30 is performed according to a first charging setting (i.e., $P_{bat}^*=P_{chrg\_1}$). If it is determined that the SOC of the stationary energy storage device 30 is below the second pre-determined threshold, as indicated at 76, then a subsequent determination is made at STEP 78 regarding whether the SOC of the stationary energy storage device 30 is greater than a third pre-determined threshold (i.e., is the SOC between the second and third thresholds). If it is determined that the SOC of the stationary energy storage device 30 is above the third pre-determined threshold, as indicated at 80, then charging of the stationary energy storage device 30 is performed according to a second charging setting (i.e., $P_{bat}^*=P_{chrg\_2}$). If it is determined that the SOC of the stationary energy storage device 30 is below the third pre-determined threshold, as indicated at 82, then a subsequent determination is made at STEP 84 regarding whether the SOC of the stationary energy storage device 30 is greater than a fourth (minimum) pre-determined threshold (i.e., is the SOC between the third and fourth thresholds). If it is determined that the SOC of the stationary energy storage device 30 is above the fourth pre-determined threshold, as indicated at 86, then charging of the stationary energy storage device 30 is performed according to a third charging setting (i.e., $P_{bat}^* = P_{chrg\_3}$). If it is determined that the SOC of the stationary energy storage device 30 is below the fourth pre-determined threshold, as indicated at 88, then a determination is made that there is a fault in/with the stationary energy storage device 30.

Referring now to FIG. 5, a technique 90 for determining an appropriate control scheme for operating the renewable energy system 10—when the utility grid 24 is operating in a normal condition—is illustrated. At an initial STEP 92 of the technique, an instantaneous power of the net-meter 22 is calculated based on sensed current and voltage readings. The instantaneous power is then filtered at STEP 94 and a determination is made at STEP 96 regarding whether the instantaneous power is greater than or less than a zero value—i.e., is a net flow of power through the net-meter 22 positive or negative, indicating whether additional power beyond that generated by the renewable energy source 12 is required to meet a load power requirement (either from the utility grid 24 or the home power supply system 18) or whether the power generated by the renewable energy source 12 is greater than that required to meet a load power requirement.

If it is determined at STEP 96 that the net flow of power through the net-meter 22 is positive, as indicated at 98, then it is determined that additional power beyond that generated by the renewable energy source 12 is required to meet a load power requirement. The technique thus continues at STEP 100, where the stationary energy storage device 30 of the home power supply system 18 (and/or the mobile energy storage device 38, if available) is discharged to provide additional power to the load 14, to supplement the power provided from the renewable energy source 12. This discharge from the home power supply system 18 assumes that the SOC of the stationary energy storage device 30 (and/or the mobile energy storage device 38) is above a pre-determined threshold, with limits being set on the discharge from the home power supply system 18 to ensure that the SOC of the stationary energy storage device 30 does not fall below a minimum threshold. The SOC of the stationary energy storage device 30 may be monitored at STEPS 102 and 104 to identify discharge limits and set a charge optimization strategy (as described in FIG. 4) for later recharging of the stationary energy storage device 30.

If it is determined at STEP 96 that the net flow of power through the net-meter 22 is negative, as indicated at 106, then it is determined that the power generated by the renewable energy source 12 is greater than that required to meet a load power requirement, such that excess power is available for recharging the home power supply system 18, supplying to additional loads, or supplying to the utility grid 24. The technique thus continues at STEP 108, where the stationary energy storage device 30 of the home power supply system 18 (and/or the mobile energy storage device 38, if available) is recharged by (a portion of) the renewable power generated by the renewable energy source 12. This providing of recharging power to the home power supply system 18 assumes that the SOC of the stationary energy storage device 30 (and/or the mobile energy storage device 38) is below a pre-determined threshold, such that it is determined that recharging is desired. The amount of the excess power available from the renewable energy source 12 and the charge optimization strategy (as described in FIG. 4) for recharging of the stationary energy storage device 30 may be determined at STEPS 110 and 112, such as via appropriate look-up tables.

According to the techniques illustrated in FIGS. 3-5, an appropriate control scheme for operating the renewable energy system 10 can be determined, with examples of such control schemes now being set forth in detail here below. In a first operational control scheme for the renewable energy system 10, readings acquired by the sensors of control system 40 indicate that renewable energy is available from the renewable energy source 12, that the power requirement of the load 14 is at a "moderate" level, and that the voltage or SOC of the energy storage device(s) 30, 38 (stationary energy storage device 30 and optionally the mobile energy storage device 38) is above a predetermined threshold. Under such conditions, the controller 42—via controlling of the renewable power DC-AC inverter 16 and the voltage modification circuit 28—causes a portion or all of the available renewable energy to be supplied to the load 14 via the first connection path 34, with power being provided to the load 14 via the net-meter 22 and through the properly sized renewable power DC-AC inverter 16. The controller 42 causes relatively small or zero amount of the available renewable energy to be supplied by the utility grid 24, as indicated as a small positive or zero reading on the net-meter 22, and no energy to be supplied from the energy storage device(s) 30 of the home power supply system 18.

In a second operational control scheme for the renewable energy system 10, readings acquired by the sensors of control system 40 indicate that renewable energy is available from the renewable energy source 12 and that the power requirement of the load 14 is at a "moderate" level but highly transient, such as might occur for a short time duration motor starting, for example. Under such conditions, the controller 42—via controlling of the renewable power DC-AC inverter 16 and the voltage modification circuit 28—causes a portion of the available renewable energy sufficient to meet approximately the average power of the load to be supplied to the load 14 via the first connection path 34, with power being provided to the load 14 via the net-meter 22 and through the properly sized renewable power DC-AC inverter 16. The controller 42 also causes the transient portions of the load that exceed the available renewable power to be supplied using stored energy from the stationary energy storage device 30, and optionally the mobile energy storage device 38. The controller 42 further causes relatively small or zero amount of the available renewable energy to be supplied by the utility grid 24, as indicated as a small positive or zero reading on the net-meter 22.

When operating under the second operational control scheme, the controller 42 also causes a recharging of the stationary (and/or mobile) energy storage device 30, 38 to be performed. That is, a recharge of the energy supplied by the energy storage device(s) 30, 38 will be provided by the renewable energy source 12 at a later time period (i.e., after the transient load conditions have passed), with the controller 42 causing the voltage modification circuit 28 of the home power supply system 18 to provide recharging to the energy storage device(s) 30, 38. After the voltage or SOC of the energy storage device(s) 30, 38 is above a given threshold, the controller 42 will terminate the recharging operation, such that little or no power from the renewable energy source 12 is used to charge the energy storage device(s) 30, 38. Thus, power transfer through the home power supply system 18 is accomplished with high efficiency, with little or no energy storage unit charge loss.

In a third operational control scheme for the renewable energy system 10, readings acquired by the sensors of control system 40 indicate that the power requirement of the load 14 is at a "high" level that exceeds the power available from the renewable energy source 12. Under such conditions, the controller 42 causes the power supply DC-AC inverter 32 of the home power supply system 18 (which has a higher power rating than the renewable power DC-AC inverter 16) to use a prescribed amount of power from the available energy storage device(s) to augment the power supplied from the renewable power DC-AC inverter 16 to the electrical distribution panel 20. The controller 42 further causes relatively small or zero amount of energy to be supplied by the utility grid 24.

In providing power to the load 14 from the available energy storage device(s) 30 of the home power supply system 18, the controller 42 operates the power supply DC-AC inverter 32 to generate an AC power output that is synchronized to the same voltage, frequency, and phase of the utility grid AC waveform. That is, as AC power from the renewable power DC-AC inverter 16 and AC power from the home power supply system 18 are combined in the distribution panel 20, it is necessary that power waveform from each inverter be synchronized to the same voltage, frequency, and phase of the utility grid AC waveform. The controller 42 may thus control the power supply DC-AC inverter 32 according to known pulse width modulation (PWM) or space vector modulation (SVM) control schemes to output a desired AC waveform.

In a fourth operational control scheme for the renewable energy system 10, readings acquired by the sensors of control system 40 indicate that the power requirement of the load 14 is even higher (i.e., higher than measured when operating in the third operational control scheme), with the power requirement exceeding the power available from the renewable energy source 12 and also exceeding the maximum level of controlled power and energy supplied from the energy storage device(s) 30 of the home power supply system 18. Under such conditions, the controller 42 causes all of the available renewable energy to be supplied from the renewable energy source 12 to the load 14 via the first connection path 34, with power being provided to the load 14 via the net-meter 22 and through the properly sized renewable power DC-AC inverter 16. The controller 42 also causes power to be supplied by the utility grid 24 as necessary, in order to meet the additional load demand not provided by the renewable energy source 12. The net-meter 22 thus records a positive value during operation of the renewable energy system 10 according to the fourth operational control scheme.

In a fifth operational control scheme for the renewable energy system 10, readings acquired by the sensors of control system 40 indicate that the power requirement of the load 14 is at a "moderate" or "low" level that is less than the available renewable power from the renewable energy source 12. Under such conditions, the controller 42—via controlling of the renewable power DC-AC inverter 16 and the voltage modification circuit 28—causes a portion of the available renewable energy to be supplied to the home power supply system 18 to provide limited charge of the available energy storage device(s) (stationary and mobile energy storage devices 30, 38, if coupled), such that the energy storage device(s) 30, 38 will be charged and available to supply power when the load power again is increased. The remaining portion of renewable energy system 10's power is supplied to the load 14 through the renewable power DC-AC inverter 16 with high efficiency.

When the available energy storage devices are fully charged and cannot accept additional charge, the controller 42 causes the recharge power provided to the home power supply system 18 to be reduced to a low power "float charge" level or zero power. When additional renewable power is still available, this power may be used to operate selected home loads (e.g., pre-heating domestic hot water) or may be supplied to coupled vehicle auxiliary loads (e.g., pre-heat or pre-cool vehicle cabin), thus reducing the energy required in a future time period. After the additional loads are supplied and there is still additional renewable power available, then the excess renewable energy is supplied to the customer's distribution panel 20 and the net-meter 22 records a negative reading indicating that energy is being supplied or sold to back to the utility.

In a sixth operational control scheme for the renewable energy system 10, readings acquired by the sensors of control system 40 indicate that no power from the renewable energy source 12 is available. Under such conditions, the controller 42 determines whether to supply power to meet load power requirement using stored energy from the home power supply system 18 or to purchase power from the utility grid 24, with such a determination being based on customer supplied conditions, including historical trends, number or energy storage devices available, state-of-charge (SOC) of the available energy storage device(s), temperature, and other parameters.

Accordingly, it is seen that the home power supply system 18 and associated control system 40 intelligently control power flow from the renewable energy source 12 to the load 14 through two parallel paths, with a first connection path 34 providing a conventional renewable power DC-AC inverter 16 that is typically sized and optimized to match the maximum expected renewable power and a conventional net-metering unit 22 and a second connection path 36 providing the home power supply system 18 that incorporates a voltage modification circuit 28, at least one energy storage device 30, and an optimized power supply DC-AC inverter 32. The electrical power levels for both paths are controlled and synchronized to the same voltage, frequency, and phase of the utility grid AC electrical waveforms, with power stored in the home power supply system 18 being selectively used to provide for the optimization of electrical system efficiency of the renewable energy source 12 to the load(s) 14.

While the general configuration of the renewable energy system 10 has been described above, along with operation of the renewable energy system 10 in various modes and operating schemes, it is recognized that numerous specific configurations of the renewable energy system 10 are envisioned and considered to be within the scope of the invention. FIGS. 6-10 illustrate a number of exemplary embodiments of the renewable energy system 10 that are operable according to the basic control scheme of intelligently controlling a power flow from a renewable energy source 12 to a load 14 through two parallel paths via use of an existing grid-tied renewable power AC-DC inverter 16 and an add-on home power supply system 18 that may be retrofit thereto.

Figure 6:
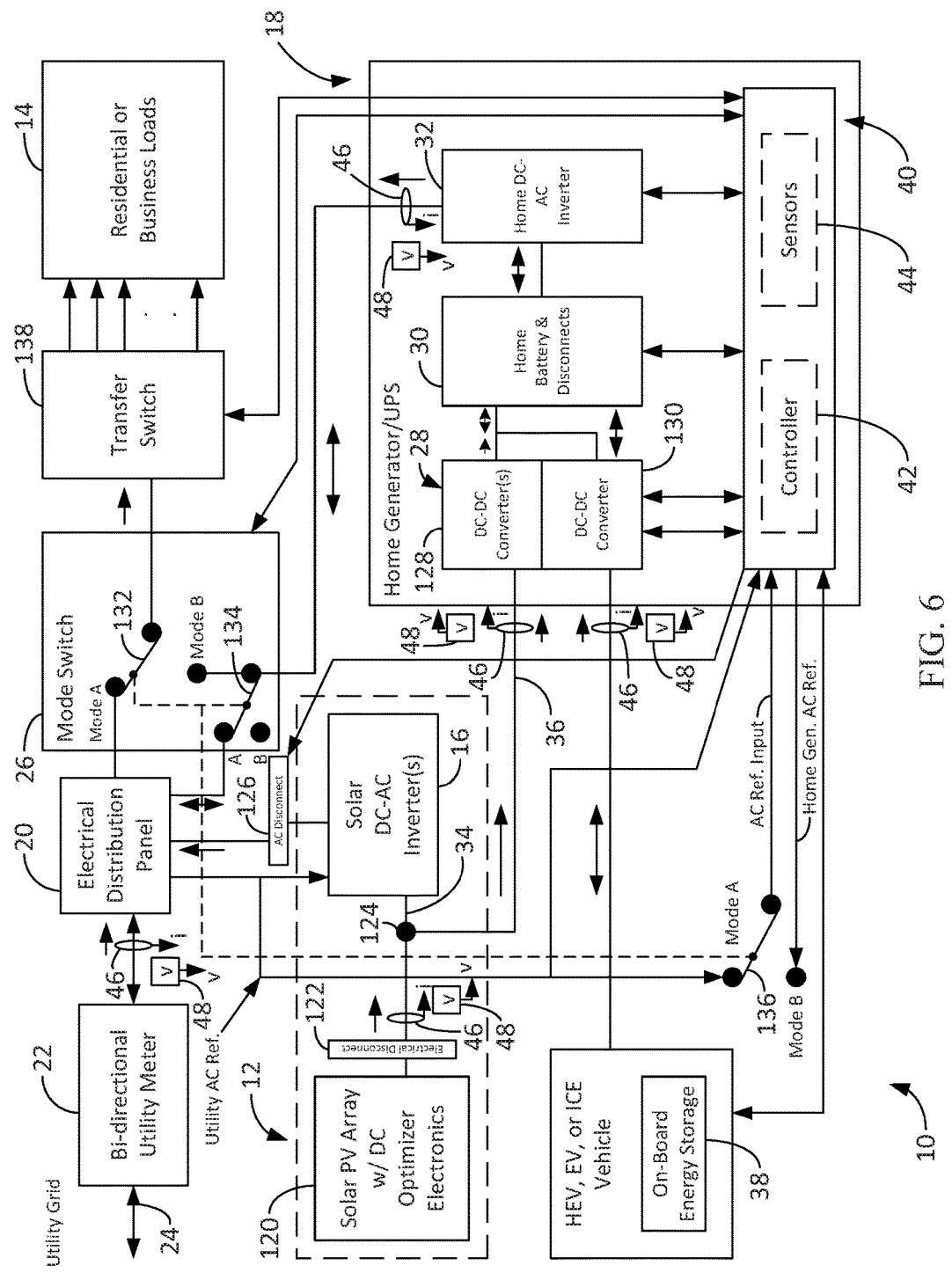
FIG. 6 is a schematic diagram of a renewable energy system according to an embodiment of the invention.

Referring first to FIG. 6, renewable energy is provided in the renewable energy system 10 via a photovoltaic (PV) array and associated DC optimizer electronics 120, as known in the art. An electrical disconnect 122 is connected to an output of the PV array 120 to control a flow of DC power generated thereby. Current and voltage sensors are positioned proximate the output of the PV array 120 to measure the current and voltage of the renewable power provided by the PV array 120, with such measurements being provided to the controller 42 as input for controlling operation of home power supply system 18.

As shown in FIG. 6, a node 124 is provided where the second connection path 36 of the renewable energy system 10 splits from the first connection path 34, with the node 124 providing a location where the add-on/retrofit home power supply system 18 can be tied-in to the existing grid-tied renewable energy system 10. A solar (renewable energy) DC-AC inverter 16 is positioned on the first connection path 34 downstream of node 124, with an AC output of the renewable power DC-AC inverter 16 being provided to the distribution panel 20 for distribution to one of the load 14 or the utility grid 24. Positioned between the renewable power DC-AC inverter 16 and the distribution panel 20 is an AC disconnect 126 that allows for the renewable power DC-AC inverter 16 to be selectively disconnected from the distribution panel 20 during occurrences of a grid failure, as will be explained in greater detail below.

As also shown in FIG. 6, the voltage modification circuit 28 of home power supply system 18 is provided as a pair of DC-DC converters—i.e., a first DC-DC converter 128 and a second DC-DC converter 130. The first DC-DC converter 128 provides an interface between the existing grid-tied renewable energy system 10 and the home power supply system 18 to selectively control a flow of DC power from the PV array 120 to the home power supply system 18 and condition the received DC power to an appropriate voltage level. The second DC-DC converter 130 provides an interface to a mobile energy storage device 38 (e.g., an HEV or EV battery) to selectively control a flow of DC power from the mobile energy storage device 38 to the home power supply system 18 and control a flow of DC power from the home power supply system 18 to the mobile energy storage device 38.

In providing an interface between the existing grid-tied renewable energy source 12 and the home power supply system 18 to selectively control a flow of DC power from the PV array 120 to the home power supply system and condition the received DC power to an appropriate voltage level, the voltage modification circuit 28 (and the first DC-DC converter 128 thereof) may comprise an arrangement of electrical components (not shown) for performing DC voltage conversion. Additionally, control system 40 controls operation of the voltage modification circuit 28 in order to regulate the amount of DC power provided thereto from the PV array 120. That is, based on inputs to and/or determinations made by the controller 42 regarding a condition of the utility grid 24, a power requirement of the load 14, a power output from the PV array 120, a maximum power limit of the array, time of day, temperature, and/or SOC of the stationary energy storage device(s) 30, a SOC of the mobile energy storage device 38, the controller 42 determines an amount or percentage of DC power from the PV array 120 to be provided to the home power supply system 18 to charge the stationary and mobile energy storage devices 30, 38. Based on this determination, the voltage modification circuit 28 functions to regulate the amount of power received thereby from the PV array 120.

The voltage modification circuit 28 is further operated by controller 42 to direct a determined level of DC power to the mobile energy storage device 38. In doing so, the SOC of the stationary and the mobile energy storage device 38 may be monitored by control system 40, with power being provided through the second DC-DC converter 130 to the mobile energy storage device 38 when it is determined that the SOC of the stationary energy storage device 30 is above a pre-determined threshold and the SOC of the mobile energy storage device 38 is below a pre-determined threshold, such that it is desirable to provide DC power generated by the PV array 120 to the mobile energy storage device 38.

As further shown in FIG. 6, the mode switch 26 of the renewable energy system 10 includes a number of switching elements 132, 134, 136 that are each actuatable between an "A" position and a "B" position. As previously indicated, the mode switch 26 is controlled by controller 42 to operate in an "emergency power" mode or a "normal" mode. In the normal mode of operation, the switching elements 132, 134, 136 of the mode switch 26 are positioned in the A position. As can be seen in FIG. 6, with the switching elements 132, 134, 136 in the A position during a normal mode, AC power output from the renewable power DC-AC inverter 16 and the power supply DC-AC inverter 32 are provided in parallel to the load 14 (through distribution panel 20), such that AC power may thus be provided to the load 14 or the utility grid 24 based on a net-metering determination. With the switching elements 132, 134, 136 in the A position, it is further seen that a utility AC reference input is provided to controller 42 regarding the voltage and frequency of the utility grid power—such that the controller 42 operates power supply DC-AC inverter 32 to output an AC power that is synchronized to the same voltage, frequency, and phase of the utility grid AC waveform (and at the same voltage, frequency and phase of the renewable power DC-AC inverter output).

With the switching elements 132, 134, 136 in the B position during an emergency power mode, only the AC power output from the power supply DC-AC inverter 32 is provided to the load 14—with the AC power output from the power supply DC-AC inverter 32 being routed through the mode switch 26 directly to a transfer switch 138 of the renewable energy system 10 for providing to the load 14 (i.e., power supply DC-AC inverter 32 is disconnected from the distribution panel 20). With the switching elements 132, 134, 136 in the B position during an emergency power mode, the AC disconnect 126 functions to disconnect the renewable power DC-AC inverter 16 from the distribution panel 20. Accordingly, no power from the PV array 120 is directed through the renewable power DC-AC inverter 16 for supplying to the load 14—only AC power from the home power supply system 18 is supplied to the load 14. With the switching elements 132, 134, 136 in the B position, it is further seen that a home power supply system AC reference input is provided from controller 42 (i.e., an internally generated AC reference within the controller 42), with the home power supply system AC reference input indicating a desired voltage and frequency for the AC power output from the power supply DC-AC inverter 32.

Figure 7:
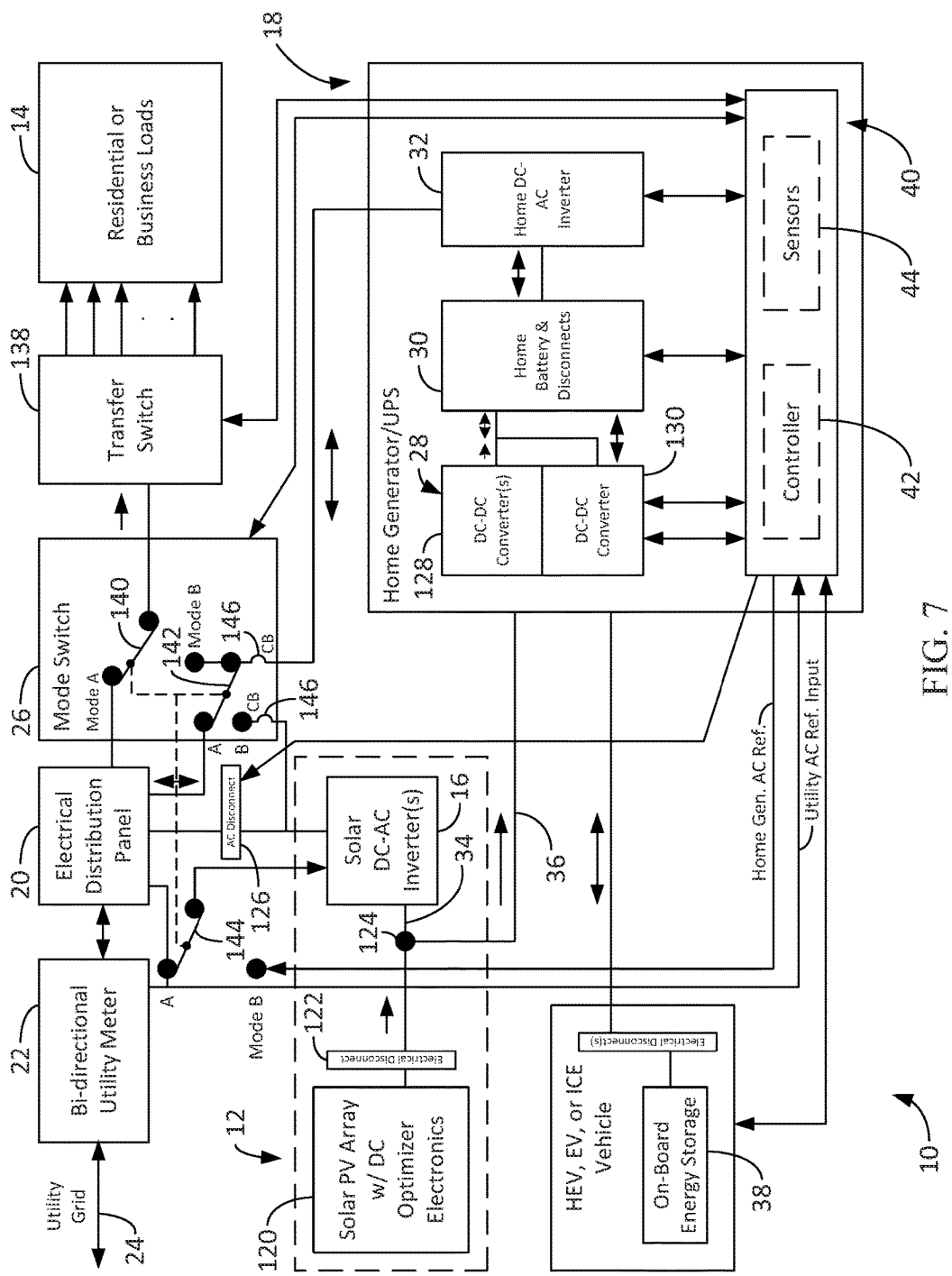
FIG. 7 is a schematic diagram of a renewable energy system according to an embodiment of the invention.

Referring now to FIG. 7, it is seen that the renewable energy system 10 is similar to that shown and described in FIG. 6. Accordingly, renewable energy is again provided in the renewable energy system 10 via a PV array and associated DC optimizer electronics 120, with an electrical disconnect controlling a flow of DC power is output from the PV array 120. Also, the construction and operation of the voltage modification circuit 28 is similar to as described in FIG. 6, with first and second DC-DC converters 128, 130 interfacing the home power supply system 18 to the PV array 120 and to a mobile energy storage device 38. However, in FIG. 7, the mode switch 26 is structured differently from the switch in FIG. 6, with the switching elements 140, 142, 144 therein providing for different operation of the renewable energy system 10 when in the emergency power mode, as will be explained in greater detail below.

As shown in FIG. 7, the mode switch 26 includes a number of switching elements 140, 142, 144 that are each actuatable between an "A" position and a "B" position based on operation of the mode switch 26 in the normal mode or the emergency power mode, respectively. In one embodiment, the switching elements 140, 142, 144 comprise poles of an electrical power switch, implemented in either a motorized mechanical switch configuration or a solid-state electrical switch, provided that it is designed to meet requirements and specifications to insure personnel safety when in the "emergency" mode (Mode B position) to protect utility personnel. With the switching elements 140, 142, 144 in the A position during a normal mode, AC power output from the renewable power DC-AC inverter 16 and the power supply DC-AC inverter 32 are provided in parallel to the load 14 (through distribution panel 20), such that AC power may thus be provided to the load 14 or the utility grid 24 based on a net-metering determination. As shown, AC power outputs from the renewable power DC-AC inverter 16 are routed through the distribution panel 20 via AC disconnect 126 (which controller 42 commands to be in the closed position) and AC power outputs from the power supply DC-AC inverter 32 are selectively routed through circuit breakers 146 of the mode switch 26 to the distribution panel 20. Alternatively, mode switch 26 and associated switching elements and circuit breakers 142, 146 could physically be mounted within transfer switch 138.

With the switching elements 140, 142, 144 in the A position, it is further seen that a utility AC reference input is provided to controller 42 regarding the voltage and frequency of the utility grid power—such that the controller 42 operates power supply DC-AC inverter 32 to output an AC power that is synchronized to the same voltage, frequency, and phase of the utility grid AC waveform (and at the same voltage, frequency and phase of the renewable power DC-AC inverter output).

With the switching elements 140, 142, 144 in the B position during an emergency power mode, AC power output from the renewable power DC-AC inverter 16 and the power supply DC-AC inverter 32 are still provided in parallel to the load 14; however, it is noted that each of the renewable power DC-AC inverter 16 and the power supply DC-AC inverter 32 is disconnected from the distribution panel 20, such that power cannot be transmitted to the utility grid 24. With the switching elements 140, 142, 144 in the B position during an emergency power mode, the AC disconnect 126 functions to disconnect the renewable power DC-AC inverter 16 from the distribution panel 20, such that AC power output from the renewable power DC-AC inverter 16 is routed through the mode switch 26 (i.e., through switching elements 140, 142) for supplying to the load 14. Additionally, AC power output from the power supply DC-AC inverter 32 is routed through the mode switch 26 (i.e., through switching element 140) for supplying to the load 14, such that AC power outputs from the renewable power DC-AC inverter 16 and the power supply DC-AC inverter 32 are arranged/provided in parallel. With the switching elements 140, 142, 144 in the B position, it is further seen that a home power supply system AC reference input is provided to controller 42 regarding the voltage and frequency of the AC power output by the renewable power DC-AC inverter 16—such that the controller 42 operates power supply DC-AC inverter 32 to output an AC power that is synchronized to the same voltage, frequency, and phase of the renewable power DC-AC inverter output.

Figure 8:
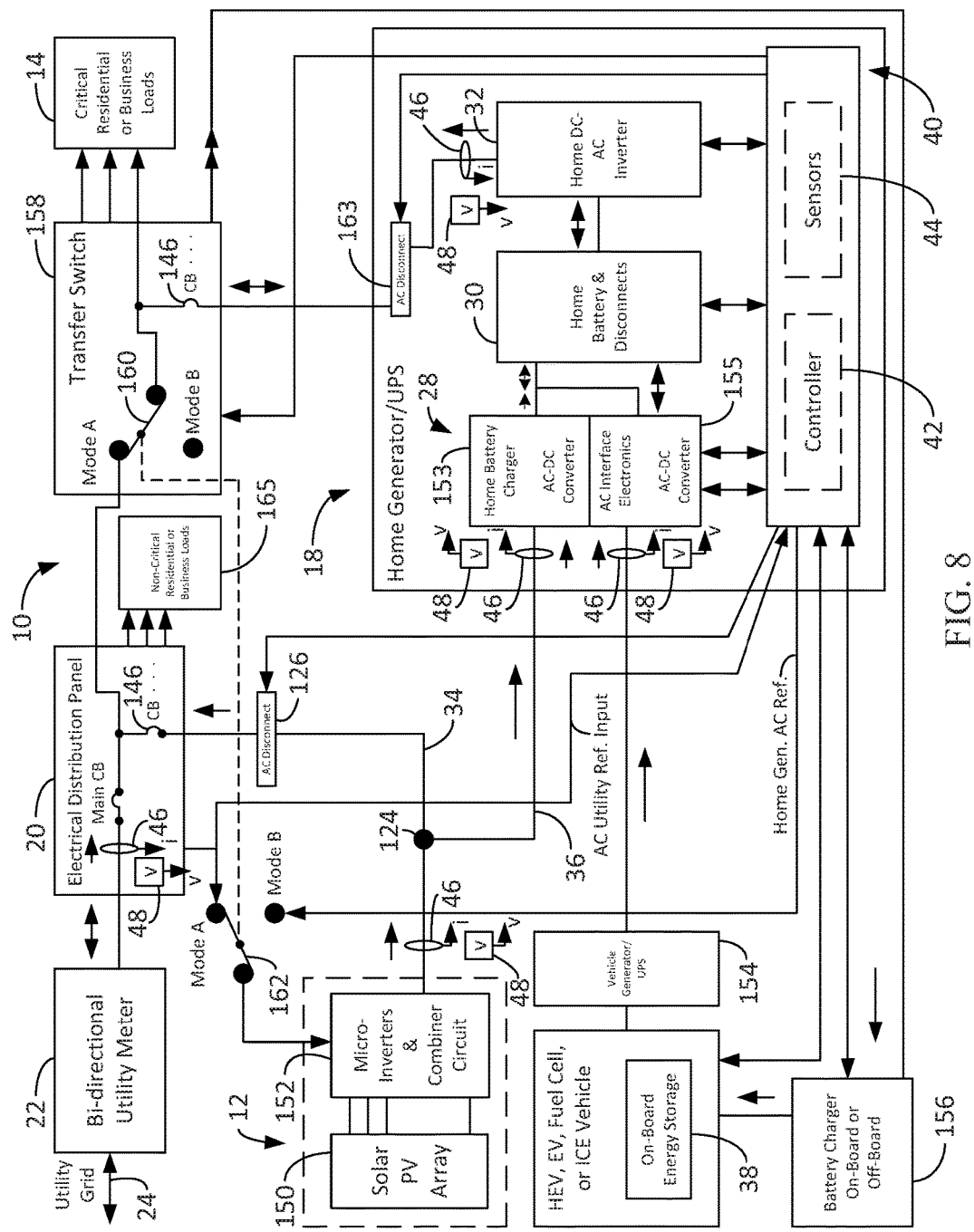
FIG. 8 is a schematic diagram of a renewable energy system according to an embodiment of the invention.

Referring now to FIG. 8, an embodiment is illustrated where renewable energy is provided in the renewable energy system 10 via a PV array 150. An arrangement of DC-AC micro-inverters 152 is provided with the PV array 150 to convert DC power generated by each of a plurality of solar cells within each module in the PV array 150 to an AC power, with a combiner circuit (collectively identified with micro-inverters as 152) coupled to the micro-inverters to combine the AC power outputs from the arrangement of micro-inverters to provide an overall AC output for the PV array 150, which can be fed to the utility grid 24 with no additional inversion required. With regard to the overall AC output, it is recognized that it is required to provide a reference excitation signal to the micro-inverters 152 in order to control the micro-inverters such that they generate an AC power having a desired voltage, frequency, and phase. Such an reference excitation signal is often provided by sensors on the utility grid 24 waveform (so that the overall AC power output from the micro-inverters and combiner circuit 152 matches the utility grid AC in voltage, frequency, and phase)—with such signals being provided via current/voltage data acquired by sensors 46, 48 (in this case incorporated into distribution panel 20) when the utility is in a normal operating mode, as explained in greater detail below. However, it is envisioned that a reference excitation signal could instead be provided by the home power supply system 18 during occurrences of a grid failure—such that the PV array 150 is still operable with micro-inverters 152 to generate an AC output, as will be explained in greater detail below. Current and voltage sensors 46, 48 are positioned proximate the output of the combiner circuit 152 to measure the current and voltage of the renewable power provided by the PV array 150, with such measurements being provided to the controller 42 as input for controlling operation of home power supply system 18.

As shown in FIG. 8, a node 124 is provided where the second connection path 36 of the renewable energy system 10 splits from the first connection path 34, with the node 124 providing a location where the add-on/retrofit home power supply system 18 can be tied-in to the existing grid-tied renewable energy system 10. An AC disconnect 126 is positioned on the first connection path 34 downstream of node 124 that allows for the distribution panel 20 to be selectively disconnected from the AC power output from the combiner circuit 152 during occurrences of a grid failure, as will be explained in greater detail below.

As also shown in FIG. 8, the voltage modification circuit 28 of home power supply system 18 is provided to include two AC-DC conversion circuits 153, 155—with AC-DC conversion circuit 153 functioning as a home battery charger for stationary energy storage device 30 and AC-DC conversion circuit 155 functioning as AC interface electronics between the home power supply system 18 and a mobile energy storage device 38. That is, as the power provided on the second connection path 36 from the PV array 150 is in the form of AC power (via micro-inverters and combiner circuit 152), AC-DC converter 153 is required in the voltage modification circuit 28 to receive such AC power and rectify the power into DC power that can be used to charge the stationary energy storage device(s) 30, such that AC-DC converter 153 functions as a battery charger. The AC-DC converter 153 provides an interface between the existing grid-tied renewable energy system 10 and the home power supply system 18 to selectively control a flow of AC power from the PV array 150 to the home power supply system and rectify the received AC power to an appropriate voltage level and waveform for charging the stationary energy storage device 30.

In providing an interface between the existing grid-tied renewable energy system 10 and the home power supply system 18 to selectively control a flow of AC power from the PV array 150 to the home power supply system and condition the received AC power to an appropriate DC power, the AC-DC converter 153 provides the functions of a home battery charger/AC interface electronics and, in one embodiment, may also be tied directly to the power supply DC-AC inverter 32 to simultaneously provide conditioned DC power input to the home DC-AC inverter 32. Additionally, control system 40 controls operation of the AC-DC converter 153 in order to regulate the amount of AC power provided thereto from the PV array 150. That is, based on inputs to and/or determinations made by the controller 42 regarding a condition of the utility grid 24, a power requirement of the load 14, a power output from the PV array 150, maximum power limit of the array, time of day, temperature, and/or SOC of the stationary energy storage device(s) 30 (and mobile energy storage device 38), the controller 42 determines an amount or percentage of AC power from the PV array 150 to be provided to the home power supply system 18 to charge the stationary energy storage device 30. Based on this determination, the AC-DC converter 153 of voltage modification circuit 28 functions to regulate the amount of power received thereby from the PV array 150.

As illustrated in FIG. 8, when a mobile energy storage device 38 (such as a battery on an HEV, PHEV, EV, and/or a fuel cell electric vehicle or fuel cell system with energy storage) is provided and connected to home power supply system 18 as an additional means of energy storage, a generator device 154 is provided that is electrically coupled to the mobile energy storage device 38. According to various embodiments, the generator device 154 may operate with the mobile energy storage device 38 to receive DC power therefrom and generate an AC power when instructed, or the generator device 154 may operate as a conventional fuel fired emergency generator. The generator device 154 is coupled to the AC-DC converter 155 of voltage modification circuit 28 and the AC interface electronics thereof, such that AC power output by the generator device 154 is provided to the AC-DC converter 155 for rectification/conditioning thereof and providing to the stationary energy storage device 30. With regard to recharging the mobile energy storage device 38, it can be seen in FIG. 8 that a battery charger 156 (on-board or off-board the HEV, PHEV, EV, etc. on which the mobile energy storage device 38 is included) is connected to the mobile energy storage device 38 to provide recharging power thereto. In an exemplary embodiment, the battery charger 156 is coupled to a mode/transfer switch 158, such that AC power provided to the mode/transfer switch can be provided to the battery charger 156. Thus, rather than recharging mobile energy storage device 38 via the home power supply system 18 through voltage modification circuit 28 (as shown in FIGS. 6 and 7), mobile energy storage device 38 may be recharged via either renewable power generated by renewable energy source 12 with the grid fully operational, or via the home power supply system 18—with such power being routed through mode/transfer switch 158 and to battery charger 156.

The mode/transfer switch 158 of the renewable energy system 10 includes a protective circuit breaker 146 and a number of switching elements 160, 162 that are each actuatable between an "A" position and a "B" position. The mode switch mode/transfer switch 158 is controlled by controller 42 to operate in an "emergency power" mode or a "normal" mode. In the normal mode of operation, the switching elements 160, 162 of the mode/transfer switch 158 are positioned in the A position. As can be seen in FIG. 8, with the switching elements 160, 162 in the A position during a normal mode, the mode/transfer switch 158 provides for AC power output from the micro-inverters/combiner circuit 152 and the power supply DC-AC inverter 32 to be supplied in parallel to the critical load(s) 14 as well as to non-critical load(s) 165, such that AC power may thus be provided to the total load (load 165 and load 14) or the utility grid 24 based on a net-metering determination. In one embodiment, an AC disconnect 163 may be provided as part of home power supply 18 to provide for selective disconnection of AC power output by the power supply DC-AC inverter 32 from the mode/transfer switch 158. With the switching elements 160, 162 in the A position, it is further seen that a utility AC reference input is provided to controller 42 regarding the voltage and frequency of the utility grid power—such that the controller 42 operates power supply DC-AC inverter 32 to output an AC power that is synchronized to the same voltage, frequency, and phase of the utility grid AC waveform (and at the same voltage, frequency and phase of the AC output of the micro-inverters/combiner circuit 152).

With the switching elements 160, 162 in the B position during an emergency power mode, only the AC power output from the power supply DC-AC inverter 32 is provided to the critical load(s) 14—with the AC power output from the power supply DC-AC inverter 32 being routed directly to the mode/transfer switch 158 of the renewable energy system 10 for providing to the critical load 14. That is, with the switching elements 160, 162 in the B position during an emergency power mode, the AC disconnect 126 functions to disconnect the micro-inverters/combiner circuit 152 from the distribution panel 20. Accordingly, no power from the PV array 150 is supplied to the critical load 14 via the first connection path 34—only AC power from the home power supply system 18 is supplied to the load 14 along the second connection path 36. With the switching elements 160, 162 in the B position, it is further seen that a home power supply system AC reference input is provided from controller 42 (i.e., an internally generated AC reference within the controller 42), with the home power supply system AC reference input indicating a desired voltage and frequency for the AC power output from the power supply DC-AC inverter 32.

Figure 9:
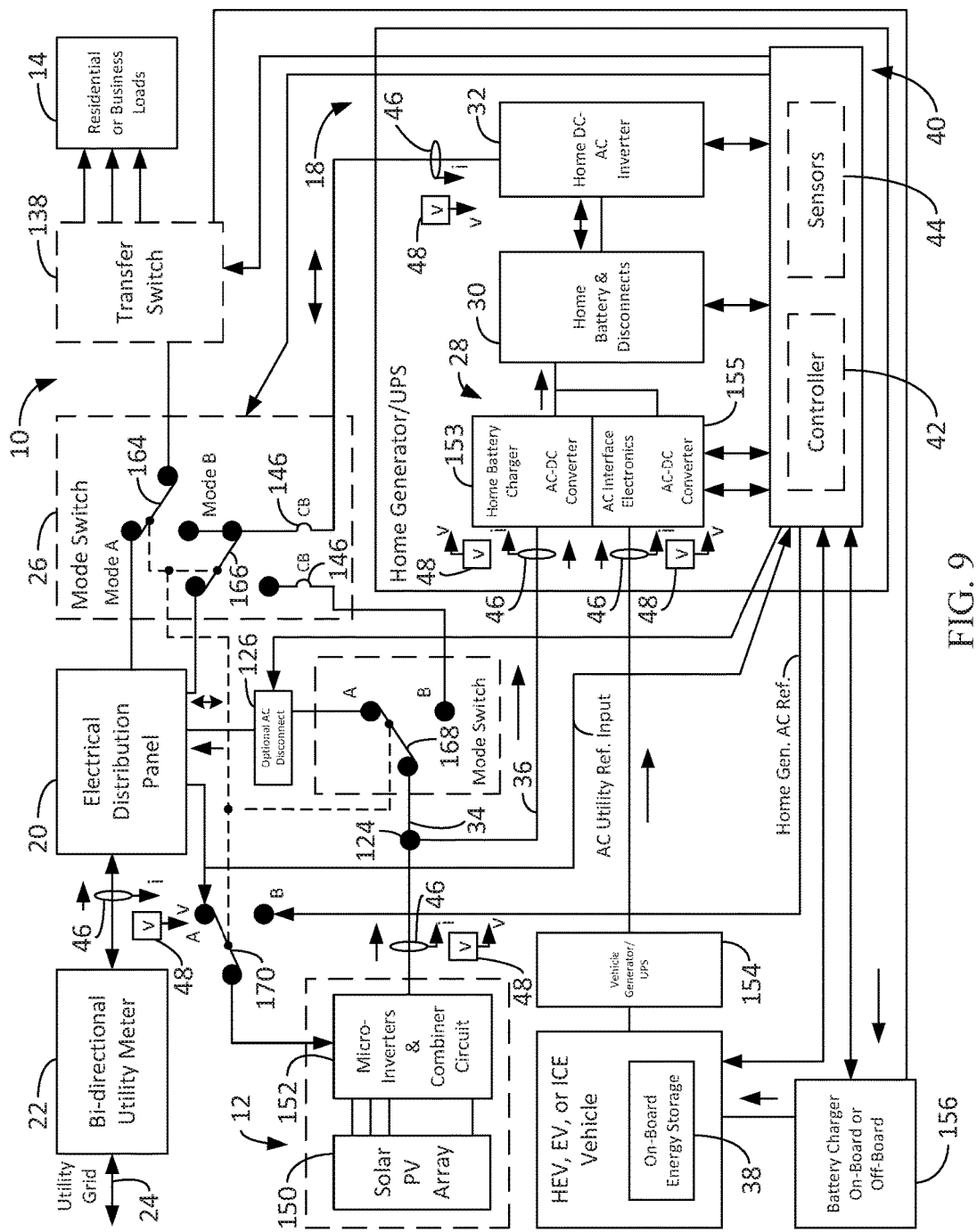
FIG. 9 is a schematic diagram of a renewable energy system according to an embodiment of the invention.

Referring now to FIG. 9, it is seen that the renewable energy system 10 is similar to that shown and described in FIG. 8. Accordingly, renewable energy is again provided in the renewable energy system 10 via a PV array 150 that operates with an arrangement of micro-inverters and combiner circuit 152 to generate an AC power output. Also, the construction and operation of the voltage modification circuit 28 is similar to as described in FIG. 8—with an AC-DC conversion circuit 153 interfacing the home power supply system 18 to the PV array 150 and functioning as a home battery charger for stationary energy storage device 30 and an AC-DC conversion circuit 155 functioning as AC interface electronics between the home power supply system 18 and a mobile energy storage device 38. However, in FIG. 9, a mode switch 26 is provided that is structured differently from the mode/transfer switch 158 in FIG. 8, with the switching elements 164, 166, 168, 170 of mode switch 26 providing for different operation of the renewable energy system 10 when in the emergency power mode, as will be explained in greater detail below. Accordingly, while an AC disconnect 126 is shown in FIG. 9 as being positioned on the first connection path 34 to disconnect the distribution panel 20 from the PV array 150, so as to prevent AC power output from the combiner circuit 152 from being provided to the distribution panel 20, it is recognized that the AC disconnect 126 is not required due to the configuration of mode switch 26, as will also be explained in greater detail below.

As shown in FIG. 9, the mode switch 26 includes a number of switching elements 164, 166, 168, 170 that are each actuatable between an "A" position and a "B" position based on operation of the mode switch 26 in the normal mode or the emergency power mode, respectively. It should be noted that mode switch 26 may be physically mounted within transfer switch element 138, and the number and specific residential or business loads connected to transfer switch 138 may be based on the electrical power rating of home power supply system 18. With the switching elements 164, 166, 168, 170 in the A position during a normal mode, AC power output from the micro-inverters/combiner circuit 152 and the power supply DC-AC inverter 32 are provided in parallel to the load 14 (through distribution panel 20), such that AC power may thus be provided to the load 14 or the utility grid 24 based on a net-metering determination. With the switching elements 164, 166, 168, 170 in the A position, it is further seen that a utility AC reference input is provided to controller 42 regarding the voltage and frequency of the utility grid power—such that the controller 42 operates power supply DC-AC inverter 32 to output an AC power that is synchronized to the same voltage, frequency, and phase of the utility grid AC waveform (and at the same voltage, frequency and phase of the micro-inverters/combiner circuit AC power output 152).

With the switching elements 164, 166, 168, 170 in the B position during an emergency power mode, AC power output from the micro-inverters/combiner circuit 152 and the power supply DC-AC inverter 32 are still provided in parallel to the load 14; however, it is noted that each of the micro-inverters/combiner circuit 152 and the power supply DC-AC inverter 32 is disconnected from the distribution panel 20, such that power cannot be transmitted to the utility grid 24. With the switching elements 164, 166, 168, 170 in the B position during an emergency power mode, and particularly switching element 168 provided on the first connection path 34 downstream of node 124, the AC output of the micro-inverters/combiner circuit 152 is disconnected from the distribution panel 20, such that AC power output from the micro-inverters/combiner circuit 152 is routed through the mode switch 26 (i.e., through switching elements 164, 166, 168) for supplying to the load 14. As indicated previously, the optional AC disconnect 126 could also be operated to further ensure that the AC output of the micro-inverters/combiner circuit 152 is disconnected from the distribution panel 20.

Additionally, with the switching elements 164, 166, 168, 170 in the B position during an emergency power mode, AC power output from the power supply DC-AC inverter 32 is routed through the mode switch 26 (i.e., through switching element 164) for supplying to the load 14, such that AC power outputs from the micro-inverters/combiner circuit 152 and the power supply DC-AC inverter 32 are arranged/provided in parallel. With the switching elements 164, 166, 168, 170 in the B position, it is further seen that a home power supply system AC reference input is provided to the micro-inverters 152 from the controller 42 (thus providing an excitation or reference signal to the micro-inverters), with the home power supply system AC reference input indicating a desired voltage and frequency for the AC power output from the micro-inverters/combiner circuit 152 and power supply DC-AC inverter 32.

Figure 10:
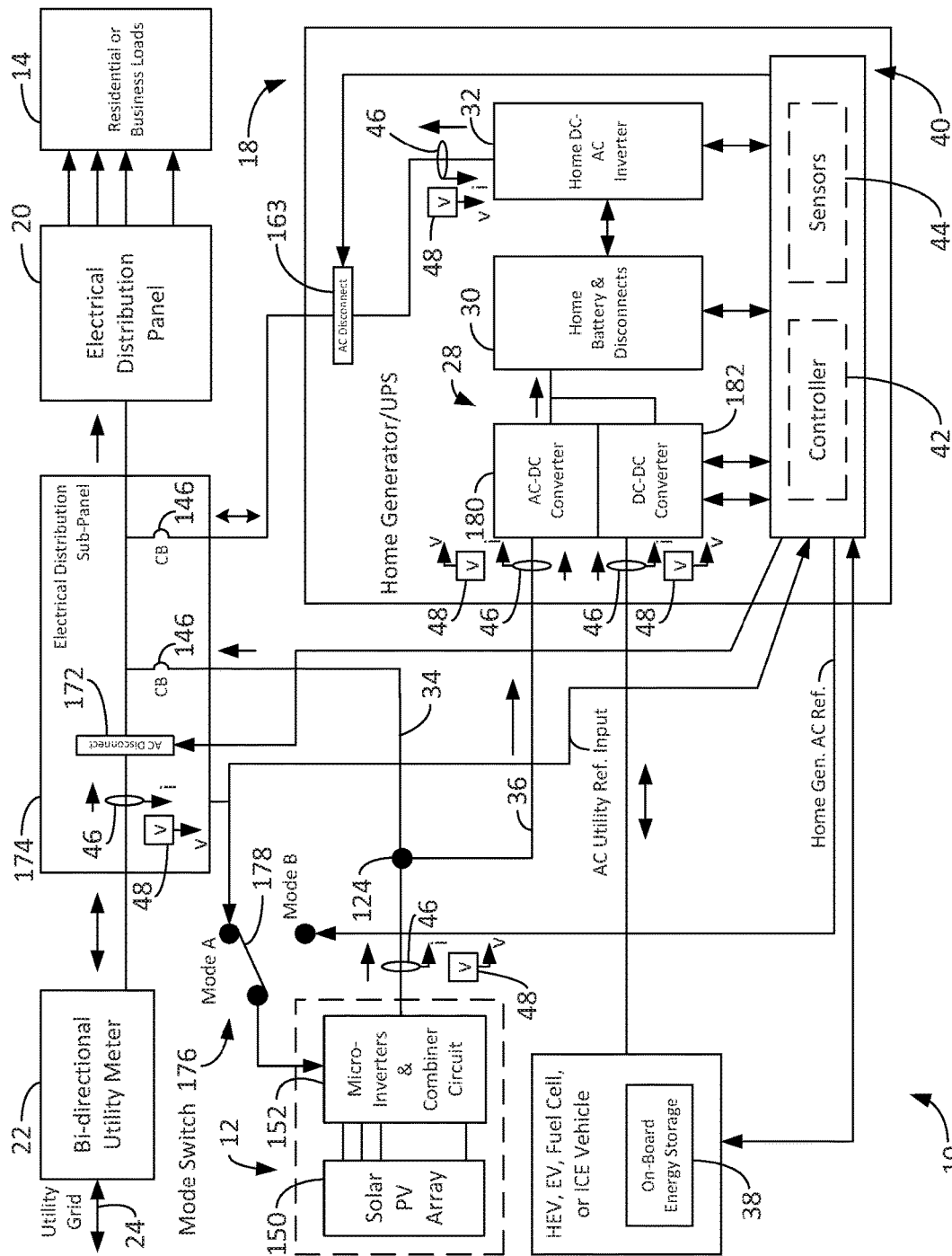
FIG. 10 is a schematic diagram of a renewable energy system according to an embodiment of the invention.

Referring now to FIG. 10, a renewable energy system 10 is illustrated where the home power supply system 18 and associated mobile energy storage device (in an HEV or EV vehicle(s)) is/are sized for a "Whole House" application. The renewable energy system 10 in FIG. 10 is similar to that of FIGS. 8 and 9 in that renewable energy is again provided in the renewable energy system 10 via a PV array 150 that operates with an arrangement of micro-inverters and combiner circuit 152 to generate an AC power output. However, in the renewable energy system 10 of FIG. 10, disconnect of the PV array 150 and micro-inverters/combiner circuit 152 from the utility grid 24 is achieved differently than in the renewable energy systems 10 of FIGS. 8 and 9 and the structure/functioning of the voltage modification circuit 28 is different than in the renewable energy systems 10 of FIGS. 8 and 9.

As shown in FIG. 10, a high current rated AC disconnect 172 is included in an electrical distribution sub-panel 174 to provide for disconnecting of the PV array 150 and micro-inverters/combiner circuit 152 from the utility grid 24. While AC disconnect 172 is shown as being incorporated into a distribution sub-panel 174, it is recognized that an alternative embodiment could have the AC disconnect 172 in the distribution panel, provided sufficient spare slots are available therein to accommodate the AC disconnect. The placement of AC disconnect 172 in distribution sub-panel 174 provides an alternative to placement of an AC disconnect 126 on the output of the micro-inverter 152 (on first connection path 34) as shown in FIG. 9, which is possible since the micro-inverters 152 for the conventional grid-tied renewable energy source 12 are designed to shut down whenever there is a loss of AC power from the grid. Also shown in FIG. 10 is an AC disconnect 163 that may be provided as part of home power supply 18 to provide for selective disconnection of AC power output by the power supply DC-AC inverter 32 from the distribution sub-panel 174.

Similar to the capabilities of renewable energy system 10 shown in FIG. 9, the renewable energy system 10 of FIG. 10 is able to provide AC power output from both the micro-inverters/combiner circuit 152 and the power supply DC-AC inverter 32 in parallel to the load 14 both during normal operation of the grid and during occurrences of a grid failure—while still providing for disconnecting of the PV array 150 and micro-inverters 152 from the utility grid 24 during grid failure. That is, placement of the AC disconnect 172 in the distribution sub-panel 174 allows for AC power output from the micro-inverters/combiner circuit 152 to be provided to the load 14 during both normal operation of the grid and occurrences of a grid failure—with the AC disconnect 172 being operated to disconnect the micro-inverters 152 from the grid 24 when a failure of the grid occurs.

To allow for AC power output from both the micro-inverters/combiner circuit 152 and the power supply DC-AC inverter 32 to be provided to the load 14 both during normal operation of the grid and during occurrences of a grid failure, a mode switch 176 (and a switching element 178 thereof) in the renewable energy system 10 is selectively operated. That is, the mode switch 176 enables a reference excitation signal to be provided to the micro-inverters 152 both during normal operation and failure of the utility grid 24—with positioning of the switching element 178 in an A position during normal operation enabling a utility AC reference input to be provided to the micro-inverters 152 and positioning of the switching element 178 in a B position during grid failure enabling a home power supply system AC reference input to be provided to the micro-inverters 152 from the controller 42.

As also shown in FIG. 10, the voltage modification circuit 28 of home power supply system 18 is provided to include an AC-DC conversion circuit 180 and a DC-DC conversion circuit 182—with AC-DC conversion circuit 180 functioning as a home battery charger for stationary energy storage device 30 and DC-DC conversion circuit 182 functioning as an interface between the home power supply system 18 and a mobile energy storage device 38. With regard to AC-DC conversion circuit 180, it is recognized that the power provided on the second connection path 36 from the PV array 150 is in the form of AC power (via micro-inverters and combiner circuit 152), and thus AC-DC converter 180 is required in the voltage modification circuit 28 to receive such AC power and rectify the power into DC power that can be used to charge the stationary energy storage device(s) 30, such that AC-DC converter 180 functions as a battery charger. The AC-DC converter 180 provides an interface between the existing grid-tied renewable energy system 10 and the home power supply system 18 to selectively control a flow of AC power from the PV array 150 to the home power supply system 18 and rectify the received AC power to an appropriate voltage level and waveform for charging the stationary energy storage device 30 (or providing directly to the power supply DC-AC inverter 32). With regard to DC-DC converter 182, the DC-DC converter 182 provides an interface to mobile energy storage device 38 (e.g., an HEV or EV battery and/or a fuel cell electric vehicle or fuel cell system with energy storage) to selectively control a flow of DC power from the mobile energy storage device 38 to the home power supply system 18 and control a flow of DC power from the home power supply system 18 to the mobile energy storage device 38.

In operating AC-DC converter 180 and DC-DC converter 182, control system 40 functions to regulate the amount of power provided thereto and output therefrom. That is, in regulating the amount of power provided to AC-DC converter 180 from micro-inverters 152 and the amount of power providing bi-directionally through DC-DC converter 182, the controller 42 operates based on inputs thereto and/or determinations made thereby regarding a condition of the utility grid 24, a power requirement of the load 14, a power output from the PV array 150, a maximum power limit of the array, time of day, temperature, a SOC of the stationary energy storage device(s) 30, and/or a SOC of the mobile energy storage device 38. Based on inputs and determinations regarding such parameters, the controller 42 determines an amount or percentage of AC power from the micro-inverters to be provided to the home power supply system 18 (via AC-DC converter 180 and the interface electronics thereof) to charge the stationary and mobile energy storage devices 30, 38 and an amount of DC power to be requested from or supplied to mobile energy storage device 38 via DC-DC converter 182.

Beneficially, embodiments of the invention thus provide an optimized home power supply system 18 that functions as a generator and uninterruptable power supply (UPS). The home power supply system 18 may be added on to (i.e., retrofitted) to an existing renewable energy system 10 that utilizes a conventional bi-directional utility meter or grid-tied net-meter 22 as an interface of the renewable energy source 12 (e.g., a solar PV array) to a residential or business load 14—with the home power supply system 18 being connected so as to provide two parallel paths 34, 36 from the renewable energy source 12 to the load 14. The home power supply system 18 accommodates bi-directional electrical coupling of a mobile energy storage device 38 thereto, such as a battery in an REV, PHEV, EV, or ICE vehicle, with such coupling being provided through a voltage modification circuit 28 of the home power supply system 18, such that the size and cost of the stationary or home battery 30 may be substantially reduced. The home power supply system 18 is configured to intelligently control the power flow from the renewable energy source 12 to the load 14 through the two parallel paths 34, 36 so as to optimize the electrical system efficiency in providing power from the renewable energy source 12 to the load 14.

Addition of the home power supply system 18 to a renewable energy system 10 also allows a customer to minimize the mismatch of electric utility rates between buying at high $/kWh rates (retail energy rate plus potential demand power rates) and selling renewable energy back to the utility at low $/kWh wholesale rates. The home power supply system 18 is able to selectively discharge power therefrom to reduce utility transient loads and carbon emissions during certain times of the day and lower or eliminate excessive demand charges to the customer. In addition, the home power supply system 18 addresses the problem of when the utility grid fails by allowing the customer loads to be supplied by the home power supply system 18, and optionally the mobile energy storage device 38 connected thereto. The power rating of the home power supply system 18 is typically larger than the maximum power of the renewable energy source 12 and therefore will allow a larger number of loads to be supplied, plus higher power transient loads to be operated during either normal operation or utility grid failures.

While embodiments of the invention described above are directed to a renewable energy system where power and energy that flows to and/or from the utility grid is "customer" controlled—with such power and energy flows being a function of residential or business loads and the capacity, state-of-charge, and voltage of the stationary energy storage devices(s) of the home power supply and the capacity, state of charge, and voltage of the optional coupled mobile energy storage device(s)—it is recognized that the renewable energy system may also be selectively controlled by the utility provider. That is, according to another embodiment of the invention, the controller of the home power supply system communicates with requests from the utility to utilize the distributed renewable energy source with the home power supply system (and one or more optional mobile energy storage device(s)) to provide energy to the utility as requested. Such requests from the utility to draw/receive energy from the distributed renewable energy source and home power supply may be utilized as a solution to voltage sags and instabilities plus power factor compensation for the customer's site or within the neighborhood and to meet utility peak power demands during time periods when renewable power generation is not available.

Figure 11:
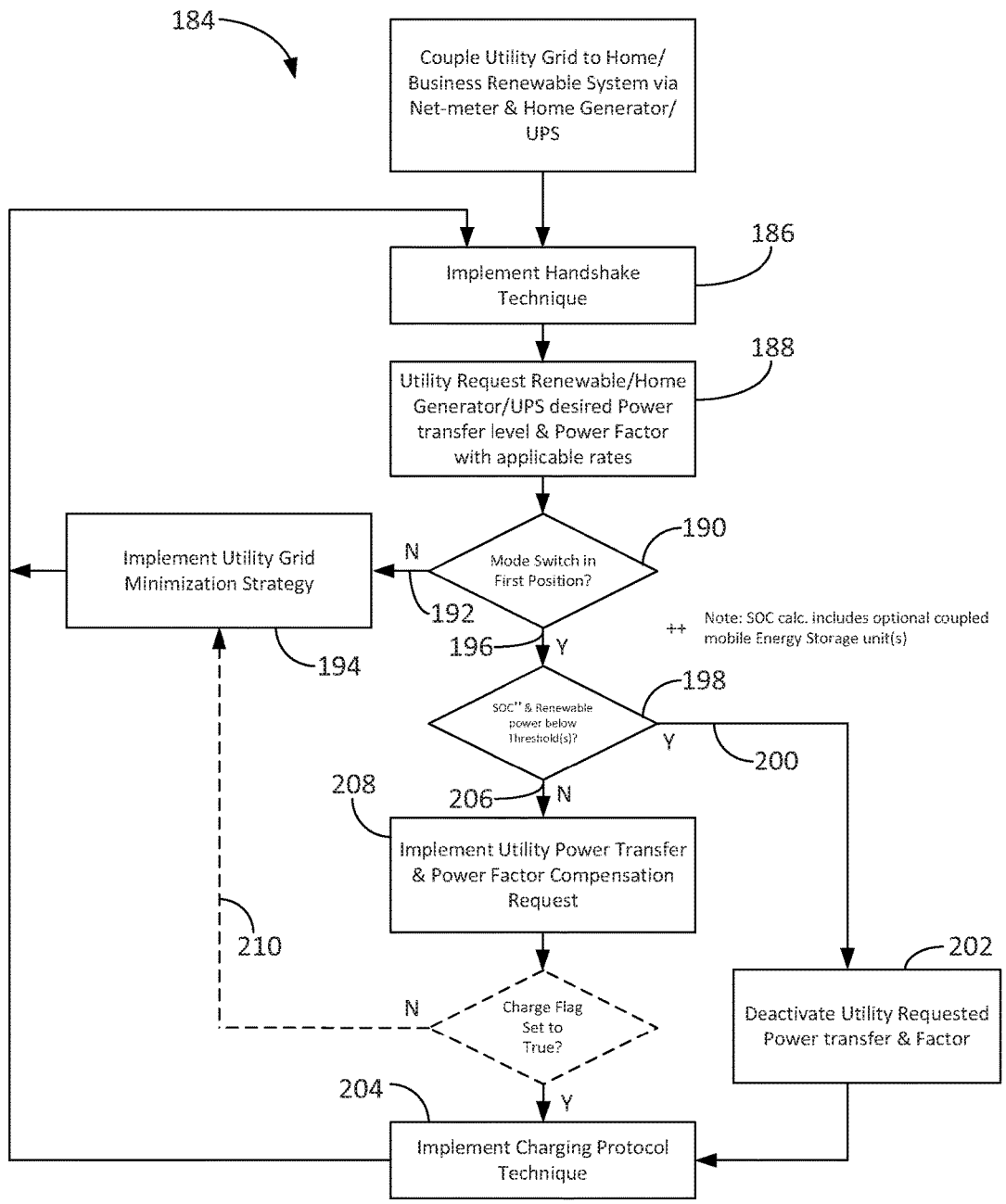
FIG. 11 is a flowchart illustrating a technique for communicating a utility request for electrical power and energy transfer from a renewable energy system to the grid according to an embodiment of the invention.

Referring now to FIG. 11, and with reference back to the renewable energy system 10 of FIG. 1, a handshake technique 184 for communicating a utility request for electrical power and energy transfer from the renewable energy system to the grid is illustrated—with it being recognized that the technique may be implemented utilizing any of the renewable energy system embodiments shown in FIGS. 6-10. As a pre-cursor to implementing the technique 184, it is seen in FIG. 11 that the utility grid 24 must be coupled to the renewable energy system 10 to provide for energy transfer therebetween, as well as to provide for communicating a utility request to the home power supply system.

Assuming that the utility grid 24 is coupled to the renewable energy system 10 and that the utility grid is operating in a "normal" mode (as previously described), the technique 184 is implemented via a starting of the handshake protocol at STEP 186. Upon initiation of the technique, a request is transmitted from the utility, or through the utility's administrator, to the renewable energy system 10 via the net-meter and the controller of home power supply at STEP 188—with the request comprising a request for electrical power and energy transfer that includes a desired power transfer level, power factor and energy or time duration of the power transfer. Also included in the utility request is information on the present rates ($/kWh) that will apply if the utility request is accepted by the renewable supply owner or administrator—such that the owner/customer has knowledge of what compensation will be provided should he or she agree to provide power back to the utility.

Upon receipt of the utility request at the controller, a determination is made at STEP 190 regarding whether a mode switch of the renewable energy system 10—which may comprise mode switch 26 (i.e., a switching element thereof) or a separate mode switch dedicated to regulating interaction with utility grid requests—is in a first or "yes" position indicating that the customer will conditionally accept the utility's request for power, power factor compensation, and energy transfer, or is in a second or "no" position indicating that the customer will reject the utility's request. If the mode switch is in the no/second position indicating that the customer wishes to reject the utility's request, as indicated at 192, then implementation of a grid minimization strategy is performed at STEP 194. In implementing such a grid minimization strategy, the controller 42 will operate renewable energy system 10 such that—when renewable power is available/generated from renewable energy source 12 beyond that required to operate a load 14 and fully charge the stationary and mobile energy storage devices 30, 38—this power may be prioritized to operate additional selected home loads (e.g., pre-heating domestic hot water) or may be supplied to coupled vehicle auxiliary loads (e.g., pre-heat or pre-cool vehicle cabin) before supplying any excess renewable energy to the utility grid 24. Accordingly, power transfer back to the utility grid 24 is minimized.

Conversely, if the mode switch is in the yes/first position indicating that the customer wishes to conditionally accept the utility's request, as indicated at 196, then the technique 184 continues by determining at STEP 198 whether a SOC of the stationary energy storage device, as well as the optionally coupled mobile energy storage device and present and near term projected levels of renewable power, are greater or less than appropriate threshold(s). If it is determined that the SOC and the projected levels of renewable power are less than their respective thresholds, as indicated at 200, then the technique continues by deactivating the utility requested power transfer at STEP 202 and subsequently implementing a charging protocol at STEP 204 Such a charging protocol technique may be similar to the technique 64 that is shown and described in FIG. 4, with it being recognized that electric energy could also be used from the grid to recharge energy storage device(s), for example if necessary to maintain energy storage SOC and voltage above absolute minimum values. Alternatively, if it is determined at STEP 198 that the SOC and the projected levels of renewable power are above their respective thresholds, as indicated at 206, then the technique 184 continues at STEP 208 by completing the requested utility power transfer, along with performing any required power factor compensation. In one embodiment, requested utility power transfer and power factor compensation requires the home power supply system's controller 42 to first selectively control the flow of electrical power from the renewable energy source 12 to the home power supply 18 and set the voltage, frequency, amplitude and phase of home power supply inverter's output AC current waveform relative to the reference voltage waveform per the utility's request. In doing so, it is recognized that the amplitude of the second connection path 36 to the distribution panel 20 may be set to a relatively high value, near max percentage (since in normal mode, the AC reference is based on the utility waveform), thus the AC reference for the micro-inverters (for the micro-grid technology case) will be based on the utility grid, and most of the renewable power would be fed to the home power supply system 18 that would then be AC-DC converted and provide power for battery charging and also to supply power to the home power supply's DC-AC inverter 32 that is producing prescribe power factor compensated waveform. With such power factor compensation, voltage, frequency, and phase of the parallel first and second connection paths 34, 36 are synchronized to the same voltage and frequency but not necessarily to the same current and phase (as opposed to voltage, frequency, current and phase of the first path, second path, and utility grid being the same in the technique of FIG. 5, for example).

In one embodiment, an owner may deactivate the utility requested power transfer by setting a Charge Flag to "no," as indicated in phantom at 210. That is, if it is determined that the SOC and the projected levels of renewable power are above their respective thresholds such that the requested utility power transfer may be performed, an owner may still deactivate the utility requested power transfer. If the utility requested power transfer is deactivated within an agreed upon level of power or energy transfer, a potential economic or rate penalty may be imposed on the renewable system owner.

In the event that the requested utility power transfer is completed, the technique continues at STEP 204 by implementing the charging protocol. As previously indicated, such a charging protocol may be similar to the technique 64 that is shown and described in FIG. 4. In performing such a charging, if the level of renewable power generated by renewable energy source 12 is sufficient to meet the utility's requested power transfer (for example when no power factor compensation requested), without using power from the stationary energy storage device and/or the optional coupled mobile energy storage device, renewable power generated by the renewable energy source 12 that is sufficient to meet the utility's requested power transfer is provided to the utility, with any excess power beyond that that is generated by the renewable energy source 12 being utilized in the renewable energy system for recharging energy storage devices. Upon performing the charging protocol at STEP 204, it is seen that the technique 184 then loops back to STEP 186, where starting of the handshake protocol is again initiated.

As indicated above, the handshake technique 184 shown and described in FIG. 11 is only implemented in the event that the utility grid is operating in a "normal" mode. In the case of a utility grid failure, or an "emergency" mode, the handshake technique detects that no grid is present, and the renewable energy system 10 (and home power supply system 18 and controller 42 thereof in particular) is electrically decoupled from the grid 24, such that no power or energy is transferred to the utility, thus preventing potential harm to utility lineman or service repair personnel.

Beneficially, the technique provides a solution for a utility to supply the peak power demand during time periods both when renewable power generation is available and also when renewable power is not available. The technique provides such a solution without requiring the utility to: increase overall generating capacity with additional supplemental generation (e.g., by using gas turbine units or fuel-fired portable generators); add large and costly utility stationary energy storage unit(s), i.e. grid-storage unit(s); use alternative energy storage, i.e. pump storage system, increase the capacity or add new main generation systems, requiring substantial expense and multiple years to complete; and/or increase the number and capacity of renewable energy systems with additional stationary battery energy storage.

The technique also beneficially provides a solution for addressing low power factor issues without necessitating static volt-ampere reactive (VAR) compensation located near the industrial or business site and/or active power factor correction using double conversion and associated energy storage units. By addressing low power factor issues efficiently, increased peak current and heating in transformers and distribution lines may be prevented, as well as voltage sags and instabilities.

Therefore, in accordance with one embodiment of the invention, a renewable energy system coupleable to each of a utility grid and a load includes a renewable energy source configured to generate a power output and a power supply system connected to the renewable energy source to selectively receive at least a portion of the power output, the power supply system comprising a voltage modification circuit configured to condition power received thereby to generate a DC power output, at least one energy storage device configured to store the DC power output from the voltage modification circuit, and a power supply inverter connected to the at least one energy storage device to receive DC power therefrom and convert the DC power to an AC power output. The renewable energy system also includes a controller in operable communication with the renewable energy source, the power supply system and the utility grid to control a transfer of power therebetween, the controller being programmed to receive a power transfer request from the utility grid, the power transfer request including at least one of a desired power transfer level, power factor and energy or time duration of the power transfer, compare a state-of-charge (SOC) of the at least one energy storage device and the power output of the renewable energy source to respective pre-determined SOC and power output thresholds, complete the power transfer request from the utility grid if one or both of the SOC of the at least one energy storage device and the power output of the renewable energy source are greater than the respective SOC and power output thresholds, and deactivate the power transfer request from the utility grid if one or both of the SOC of the at least one energy storage device and the power output of the renewable energy source are less than the respective SOC and power output thresholds.

In accordance with another embodiment of the invention, a method is provided for regulating a power transfer between a utility grid and a renewable energy system that includes a renewable energy source and a power supply system configured to selectively store and condition power provided thereto via an arrangement of a voltage modification circuit, energy storage system and power supply DC-AC inverter in the power supply system. The method includes receiving a power transfer request from the utility grid at a controller of the renewable energy system, the power transfer request including at least one of a desired power transfer level, power factor and energy or time duration of the power transfer to the utility grid. The method also includes comparing, via the controller, a state-of-charge (SOC) of one or more energy storage devices of the energy storage system and a power output of the renewable energy source to respective pre-determined SOC and power output thresholds, completing the power transfer request from the utility grid if one or both of the SOC of the one or more energy storage devices and the power output of the renewable energy source are greater than the respective SOC and power output thresholds so as to cause the requested power to be transferred to the utility grid, and denying the power transfer request from the utility grid if one or both of the SOC of the one or more energy storage devices and the power output of the renewable energy source are less than the respective SOC and power output thresholds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A renewable energy system coupleable to each of a utility grid and a load, the renewable energy system comprising:
   a renewable energy source configured to generate a power output;
   a power supply system connected to the renewable energy source to selectively receive at least a portion of the power output, the power supply system comprising:
      a voltage modification circuit configured to condition power received thereby to generate a DC power output;
      at least one energy storage device configured to store the DC power output from the voltage modification circuit; and
      a power supply inverter connected to the at least one energy storage device to receive DC power therefrom and convert the DC power to an AC power output; and
   a controller in operable communication with the renewable energy source, the power supply system and the utility grid to control a transfer of power therebetween, the controller being programmed to:
      receive a power transfer request from the utility grid, the power transfer request including at least one of a desired power transfer level, power factor and energy or time duration of the power transfer;
      compare a state-of-charge (SOC) of the at least one energy storage device and the power output of the renewable energy source to respective pre-determined SOC and power output thresholds;
      complete the power transfer request from the utility grid if one or both of the SOC of the at least one energy storage device and the power output of the renewable energy source are greater than the respective SOC and power output thresholds; and deactivate the power transfer request from the utility grid if one or both of the SOC of the at least one energy storage device and the power output of the renewable energy source are less than the respective SOC and power output thresholds.

2. The renewable energy system of claim 1 wherein, in deactivating the power transfer request from the utility grid, the controller is further programmed to implement a charging protocol to charge the at least one energy storage device, the charging protocol causing power from at least one of the renewable energy source and the utility grid to be provided to the at least one energy storage device.

3. The renewable energy system of claim 1 wherein, in completing the power transfer request from the utility grid, the controller is further programmed to:
selectively control the flow of electrical power from one or both of the renewable energy source and the power supply system to the utility grid; and
when power is provided from the power supply system to the utility grid, set a frequency, amplitude, and phase of the AC power output of the power supply inverter relative to a reference voltage waveform included in the power transfer request from the utility grid, so as to provide a desired power factor compensated waveform to the utility grid.

4. The renewable energy system of claim 3 further comprising:
a renewable energy inverter connected to the renewable energy source to convert at least a portion of the power output of the renewable energy source to an AC power output; and
a distribution panel operable to selectively connect the renewable energy inverter to each of the utility grid and the load;
wherein the renewable energy inverter is connected to the distribution panel along a first connection path and the home power supply is connected to the distribution panel along a second connection path in parallel with the first connection path; and
wherein the controller is programmed to control the power supply inverter to output a power factor compensated waveform having a voltage and frequency that is synchronized with a voltage and frequency of the AC power output of the renewable energy inverter, but with potentially a different current and phase.

5. The renewable energy system of claim 4 wherein the controller is programmed to:
identify an operative state of the utility grid, the operative state comprising one of a fully functioning utility grid and a utility grid failure;
enable a power transfer between the renewable energy system and the utility grid when the operative state of the utility grid is identified as being a fully functioning utility grid; and
disable a power transfer between the renewable energy system and the utility grid when the operative state of the utility grid is identified as being a utility grid failure.

6. The renewable energy system of claim 1 wherein, in completing the power transfer request, without power factor compensation, from the utility grid, the controller is further programmed to:
meet the power transfer request by causing the renewable energy source to provide the power output thereof to the utility grid when the power output is sufficient to meet the requested power transfer; and
cause any excess power of the renewable energy source power output beyond that sufficient to meet the requested power transfer to be provided to the at least one energy storage device of the power supply system.

7. The renewable energy system of claim 1 further comprising a mode switch operable in a first state and a second state to regulate power transfer requests from the utility grid to the controller.

8. The renewable energy system of claim 7 wherein, when the mode switch is in the first state, the controller is programmed to:
conditionally accept the power transfer request from the utility grid; and
subsequently compare the SOC of the at least one energy storage device and the power output of the renewable energy source to the respective pre-determined SOC and power output thresholds to determine whether to complete or deactivate the power transfer request.

9. The renewable energy system of claim 7 wherein, when the mode switch is in the second state, the controller is programmed to reject the power transfer request from the utility grid.

10. The renewable energy system of claim 9 wherein the controller is further programmed to implement a utility grid minimization strategy such that, when the power output of the renewable energy source is beyond that required to operate the load and fully charge the at least one energy storage device, the additional output power is prioritized to operate additional selected home loads or supplied to coupled vehicle auxiliary loads before supplying the additional output power to the utility grid.

11. The renewable energy system of claim 1 wherein the power transfer request further includes information on present electricity rates that will apply if the power transfer request from the utility grid is completed.

12. The renewable energy system of claim 1 wherein the controller is further programmed to:
determine a power requirement of the load;
compare the power requirement of the load to the power output from the renewable energy source;
identify the SOC of the at least one energy storage device of the power supply system; and
selectively control a flow of the output power of the renewable energy source to the load and to the power supply system based on the comparison of the power requirement of the load to the power output from the renewable energy source and based on the SOC of the at least one energy storage device.

13. The renewable energy system of claim 1 wherein the at least one energy storage device comprises:
a stationary energy storage device electrically coupled to a first voltage converter of the voltage modification circuit and comprising one or more home batteries; and
a mobile energy storage device bi-directionally electrically coupled to a second voltage converter of the voltage modification circuit, the mobile energy storage device incorporated into one of a hybrid electric vehicle (HEV), a plug-in hybrid electric vehicle (PHEV), an electric vehicle (EV), a fuel cell electric vehicle or fuel cell system with energy storage, or an internal combustion engine (ICE) vehicle.

14. The renewable energy system of claim 1 wherein, in completing and deactivating the power transfer request, the controller is further programmed to:
complete the power transfer request from the utility grid if both of the SOC of the at least one energy storage device and the power output of the renewable energy source are greater than the respective SOC and power output thresholds; and
deactivate the power transfer request from the utility grid if one or both of the SOC of the at least one energy storage device and the power output of the renewable energy source are less than the respective SOC and power output thresholds.

15. A method for regulating a power transfer between a utility grid and a renewable energy system that includes a renewable energy source and a power supply system configured to selectively store and condition power provided thereto via an arrangement of a voltage modification circuit, energy storage system and power supply DC-AC inverter in the power supply system, the method comprising:
receiving a power transfer request from the utility grid at a controller of the renewable energy system, the power transfer request including at least one of a desired power transfer level, power factor and energy or time duration of the power transfer to the utility grid;
comparing, via the controller, a state-of-charge (SOC) of one or more energy storage devices of the energy storage system and a power output of the renewable energy source to respective pre-determined SOC and power output thresholds;
completing the power transfer request from the utility grid if one or both of the SOC of the one or more energy storage devices and the power output of the renewable energy source are greater than the respective SOC and power output thresholds, so as to cause the requested power to be transferred to the utility grid; and
denying the power transfer request from the utility grid if one or both of the SOC of the one or more energy storage devices and the power output of the renewable energy source are less than the respective SOC and power output thresholds.

16. The method of claim 15 wherein, in denying the power transfer request from the utility grid, the method further comprises implementing a charging protocol to charge the at least one energy storage device, the charging protocol causing power from at least one of the renewable energy source and the utility grid to be provided to the at least one energy storage device.

17. The method of claim 15 wherein, in completing the power transfer request from the utility grid, the method further comprises selectively controlling the flow of electrical power from the renewable energy source and the power supply system to the utility grid, such that a proportion of the flow of electrical power provided from the renewable energy source to the utility grid in comparison to a proportion of the flow of electrical power provided from the power supply system to the utility grid is controlled.

18. The method of claim 17 wherein, when providing power from the power supply system to the utility grid, the method further comprises setting a voltage, frequency, current amplitude, and phase of the AC power output of the power supply DC-AC inverter relative to a reference voltage waveform included in the power transfer request from the utility grid, so as to provide a desired power factor compensated waveform.

19. The method of claim 15 further comprising selectively operating a mode switch in the renewable energy system in a first state and a second state responsive to an operator input, so as to regulate power transfer requests from the utility grid to the controller;
wherein operating the mode switch in the first state comprises:
conditionally accepting the power transfer request from the utility grid; and
subsequently comparing the SOC of the at least one energy storage device and the power output of the renewable energy source to the respective pre-determined SOC and power output thresholds to determine whether to complete or deny the power transfer request; and
wherein operating the mode switch in the second state comprises rejecting the power transfer request from the utility grid.

20. The method of claim 19 wherein, when operating the mode switch in the second state, the method further comprises implementing a utility grid minimization strategy such that, when the power output of the renewable energy source is beyond that required to operate a load connected to the renewable energy system and to fully charge the at least one energy storage device, the additional output power is prioritized to operate additional selected home loads or supplied to coupled vehicle auxiliary loads before supplying the additional output power to the utility grid.

21. The method of claim 15 further comprising:
identifying an operative state of the utility grid, the operative state comprising one of a fully functioning utility grid and a utility grid failure;
enabling a power transfer between the renewable energy system and the utility grid through at least one of a renewable energy inverter of the renewable energy system and the power supply DC-AC inverter, when the operative state of the utility grid is identified as being a fully functioning utility grid; and
disabling a power transfer between the renewable energy system and the utility grid through the renewable energy inverter and the power supply DC-AC inverter, when the operative state of the utility grid is identified as being a utility grid failure.

* * * * *

UNITED STATES PATENT AND TRADEMARK OFFICE
CERTIFICATE OF CORRECTION

| | |
|---|---|
| PATENT NO. | : 9,817,423 B2 |
| APPLICATION NO. | : 14/987998 |
| DATED | : November 14, 2017 |
| INVENTOR(S) | : King |

It is certified that error appears in the above-identified patent and that said Letters Patent is hereby corrected as shown below:

In the Specification

Column 1, Line 65, delete "high. Accordingly," and substitute therefore -- high. --.

Column 7, Line 5, delete "or and" and substitute therefore -- or an --.

Column 22, Line 3, delete "REV," and substitute therefore -- HEV, --.

Column 23, Line 55, delete "204 Such" and substitute therefore -- 204. Such --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*